(12) United States Patent
Terahara

(10) Patent No.: US 7,864,446 B2
(45) Date of Patent: Jan. 4, 2011

(54) LENS DRIVER UNIT, IMAGING DEVICE, AND HAND-HELD DATA TERMINAL DEVICE

(75) Inventor: Daisuke Terahara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/750,129

(22) Filed: Mar. 30, 2010

(65) Prior Publication Data

US 2010/0259837 A1 Oct. 14, 2010

(30) Foreign Application Priority Data

Apr. 10, 2009 (JP) ............................. 2009-096379
Nov. 13, 2009 (JP) ............................. 2009-260136

(51) Int. Cl.
*G02B 15/14* (2006.01)

(52) U.S. Cl. ...................... 359/696; 359/700; 359/704; 359/723; 359/726

(58) Field of Classification Search ......... 359/699–706, 359/798, 819, 821–823, 825, 826, 829, 830
See application file for complete search history.

(56) References Cited

U.S. PATENT DOCUMENTS

| | | | | |
|---|---|---|---|---|
| 5,886,830 A | * | 3/1999 | Oono et al. ................. | 359/696 |
| 5,909,320 A | * | 6/1999 | Oono et al. ................. | 359/696 |
| 6,038,404 A | * | 3/2000 | Suzuki et al. ............... | 359/696 |
| 6,128,141 A | * | 10/2000 | Sato et al. .................... | 359/696 |
| 6,456,444 B1 | * | 9/2002 | Yumiki et al. ............... | 359/696 |
| 7,061,700 B2 | * | 6/2006 | Honsho ...................... | 359/824 |
| 7,744,294 B2 | * | 6/2010 | Tsurukawa .................. | 359/826 |
| 2002/0141081 A1 | * | 10/2002 | Onda .......................... | 359/823 |
| 2009/0231732 A1 | * | 9/2009 | Sasaki ........................ | 359/700 |

FOREIGN PATENT DOCUMENTS

| | | |
|---|---|---|
| JP | 2000-137285 A | 5/2000 |
| JP | 3771909 A | 11/2003 |
| JP | 2006-330657 A | 12/2006 |
| JP | 2009-198876 A | 9/2009 |

* cited by examiner

*Primary Examiner*—Evelyn A. Lester
(74) *Attorney, Agent, or Firm*—Dickstein Shapiro LLP

(57) ABSTRACT

A lens driver unit includes a plurality of lens groups including a first lens group and a second lens group, a first lens frame with first and second engaging portions, a second lens frame with a third engaging portion to engage with the first engaging portion, a lens barrel, a first guide element, a second guide element, at least one third guide element, an engaging element, and a drive unit. In an imaging position in which all of the lens groups including the first and second lens groups are placed on an optical axis, the first lens frame is integrally moved with the second lens frame along the optical axis by engagement of the first and third engaging portions while in a contained position, the first lens frame is rotated in a predetermined direction to retreat the first lens group outside an inner diameter of the lens barrel.

12 Claims, 24 Drawing Sheets

LENS DRIVER UNIT, IMAGING DEVICE, AND HAND-HELD DATA TERMINAL DEVICE

CROSS REFERENCE TO RELATED APPLICATION

The present application is based on and claims priority from Japanese Patent Application No. 2009-096379, filed on Apr. 10, 2009 and No. 2009-260136, filed on Nov. 13, 2009, the disclosure of which is hereby incorporated by reference in its entirety.

BACKGROUND OF THE INVENTION

1. Field of the Invention

The present invention relates to a lens driver unit comprising a retractable lens barrel, and an imaging device and a hand-held data terminal device including the same.

2. Description of the Related Art

Recently, in the field of an imaging device such as a digital camera, high-performance optical systems have been developed and downsizing of the imaging device has been in progress in accordance with users' increasing demands. In such a situation, there has been a demand for an imaging device to comprise a retractable type optical system in which a lens barrel is retracted into an inside of a device body during non-use for imaging a subject. Moreover, to satisfy users' demands for downsizing a camera body or the like, it is very important to decrease the size of a movable barrel portion in an optical axis direction in a retracted state as much as possible.

In order to satisfy such a demand for downsizing a camera body, Japanese Patent No. 3771909 discloses a lens barrel which comprises a plurality of lens frames holding a plurality of lens groups respectively, a movable lens barrel containing the lens frames, and a frame driver moving the lens frames via the lens barrel, to move, to a subject side, at least part of the plurality of lens groups in a contained state in which at least part of them are retracted in a camera body so that the lens groups are to be ready for imaging a subject. Such a lens barrel is configured to include a retreat lens frame which has all the respective lens groups positioned on the optical axis in the imaging state while holding at least one of the lens groups to move it to a position away from the optical axis in the contained state. According to this lens barrel, since in the contained state a part of the lens groups are retreated outside an original storage space for the movable lens barrel, it is possible to reduce the size of the lens barrel in the optical axis direction and downsize a camera body.

However, such a lens barrel has a problem in increasing the size thereof in the contained state and increasing component costs when the number of lens groups movable along the optical axis is increased. In other words, this makes it difficult to improve lens performance without increases in costs and size and limits the freedom of lens design.

SUMMARY OF THE INVENTION

The present invention aims to provide a lens driver unit with a simple structure which can comprise an increased number of lens groups movable on the optical axis without increasing the size of a lens barrel and members thereof as well as component costs and realizes improvement in the freedom of lens design and the lens performance.

According to one aspect of the present invention, a lens driver unit which moves a plurality of lens groups between an imaging position and a contained position, the imaging position in which at least a part of the lens groups are moved to a subject side to be ready for imaging, the contained position in which the plurality of lens groups are contained in a lens barrel by retreating at least a part of the plurality of lens groups, the lens driver unit comprises the plurality of lens groups including a first lens group and a second lens group each comprised of one or more lenses, a first lens frame holding the first lens group and comprising a first engaging portion and a second engaging portion, a second lens frame holding the second lens group and comprising a third engaging portion to engage with the first engaging portion of the first lens frame, the lens barrel movably holding at least one of the plurality of lens groups other than the first and second lens groups along an optical axis, a first guide element rotatably holding the first lens frame in a predetermined direction to move closer or away to/from the optical axis and guiding the first lens frame to move along the optical axis, a second guide element guiding the second lens frame to move along the optical axis, at least one third guide element guiding the first and second lens groups to move along the optical axis when engaging with the first and second lens frames, an engaging element engaging with the second engaging portion of the first lens frame, and a drive unit driving the engaging element to rotate the first lens frame in the predetermined direction and move the first lens frame along the optical axis, wherein in the imaging position in which all of the plurality of lens groups including the first and second lens groups are placed on the optical axis, the first lens frame is integrally moved with the second lens frame along the optical axis by engagement of the first and third engaging portions while in the contained position, the first lens frame is rotated in the predetermined direction to retreat the first lens group outside an inner diameter of the lens barrel.

According to another aspect of the present invention, a lens driver unit comprises a first lens group and a second lens group, a first lens frame holding the first lens group and comprising a first engaging portion and a second engaging portion, a second lens frame holding the second lens group and comprising a third engaging portion to engage with the first engaging portion of the first lens frame, a first guide element rotatably holding the first lens frame in a predetermined direction to move closer or away to/from an optical axis and guiding the first lens frame to move along the optical axis, a second guide element guiding the second lens frame to move along the optical axis, an engaging element engaging with the second engaging portion of the first lens frame, and a drive unit driving the engaging element to rotate the first lens frame in the predetermined direction and move the first lens frame along the optical axis, wherein in an imaging position in which the first and second lens groups are placed on the optical axis, the first lens frame is integrally moved with the second lens frame along the optical axis by engagement of the first and third engaging portions while in a non-imaging position, the first lens frame is rotated in the predetermined direction to retreat the first lens group into a position away from the optical axis.

BRIEF DESCRIPTION OF THE DRAWINGS

Features, embodiments, and advantages of the present invention will become apparent from a detailed description with reference to the following drawings.

DETAILED DESCRIPTION OF THE PREFERRED EMBODIMENTS

Hereinafter, a lens driver unit according to one embodiment of the present invention will be described in detail with reference to the accompanying drawings.

Figure 1:
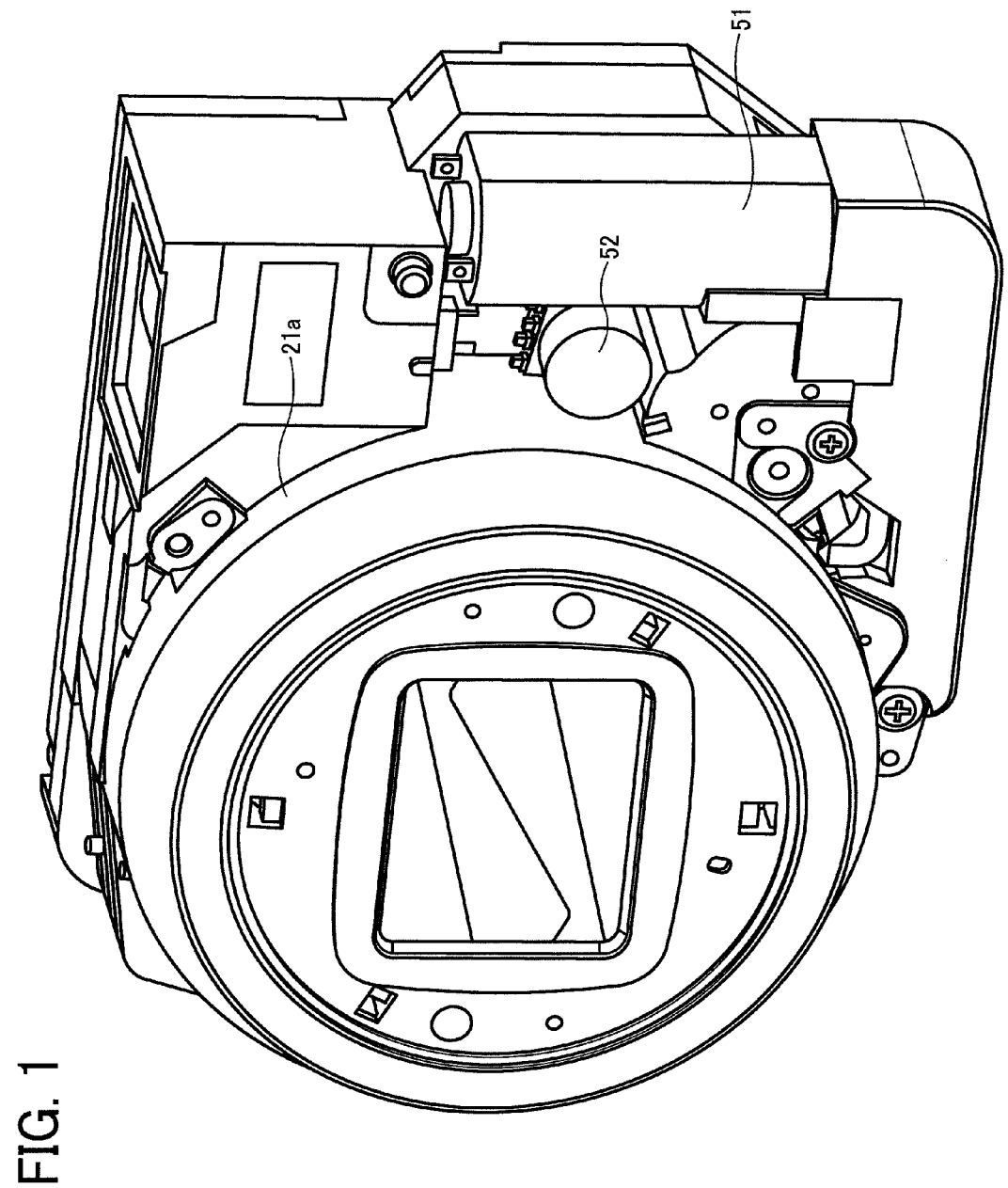
FIG. 1 is a perspective view of a lens barrel in a contained state according to a lens driver unit of one embodiment of the present invention, as seen from a subject side.
Figure 2A:
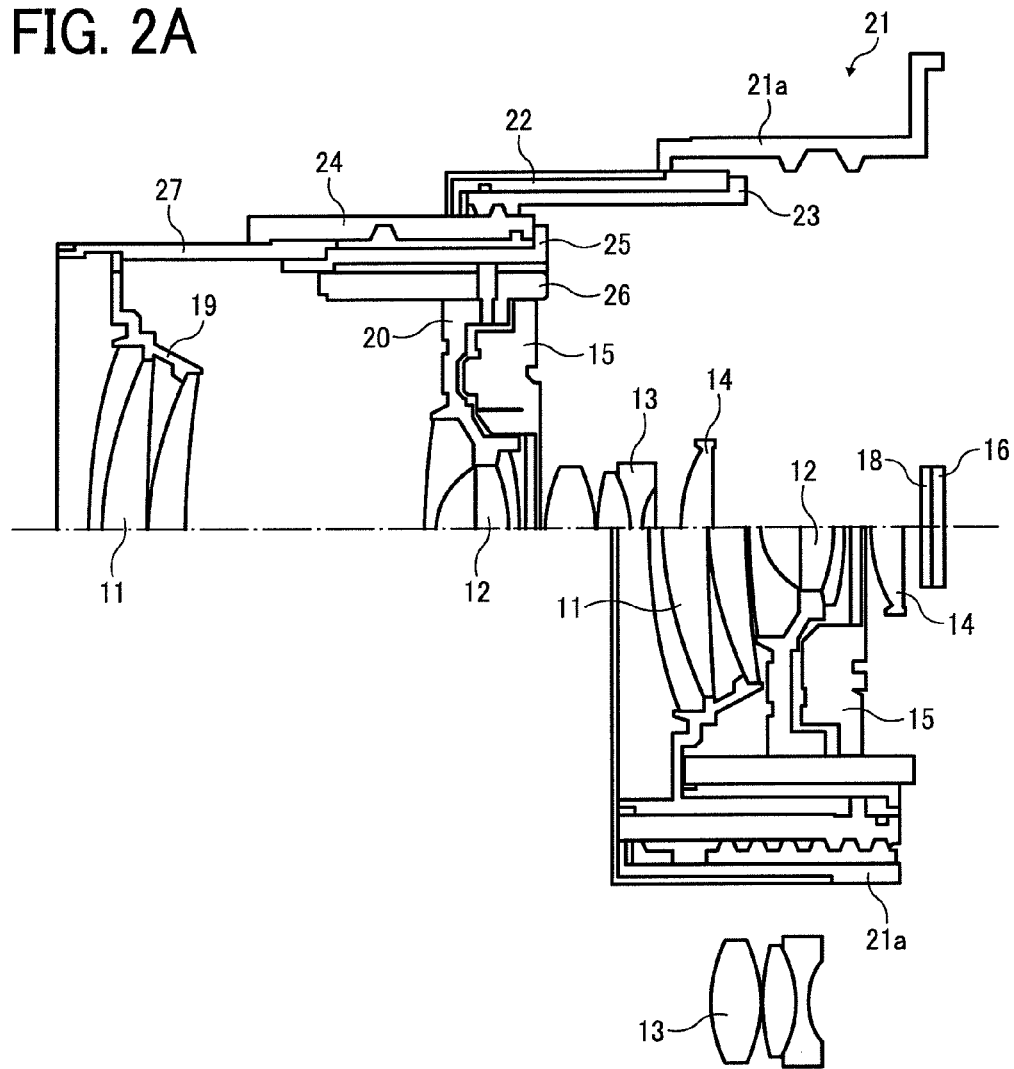
FIG. 2A cross-sectionally shows a lens structure and an essential part of a lens barrel of the lens driver unit of FIG. 1 in a telephoto position (long focus) in the top half portion and in a contained position in the bottom half portion.
Figure 2B:
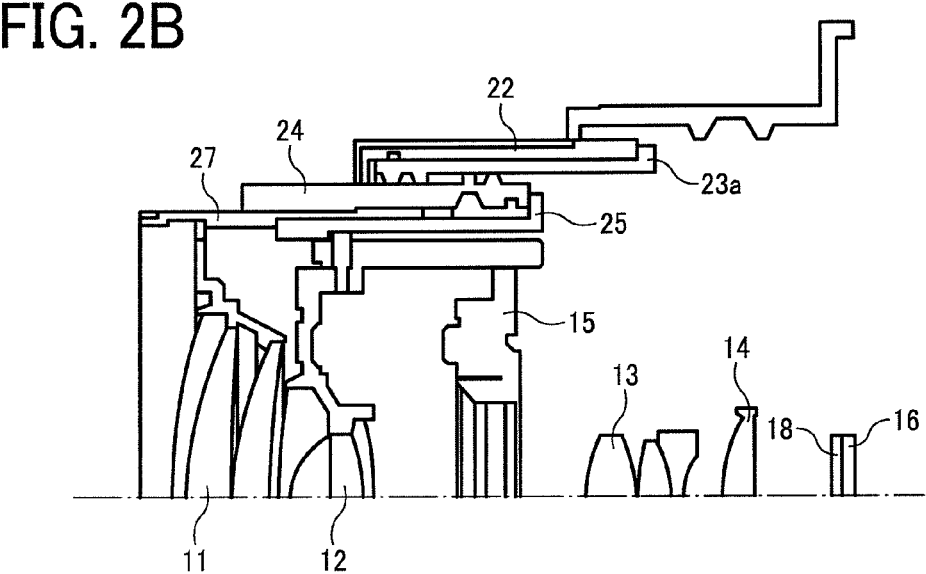
FIG. 2B shows the same in a wide angle position (short focus)
Figure 3:
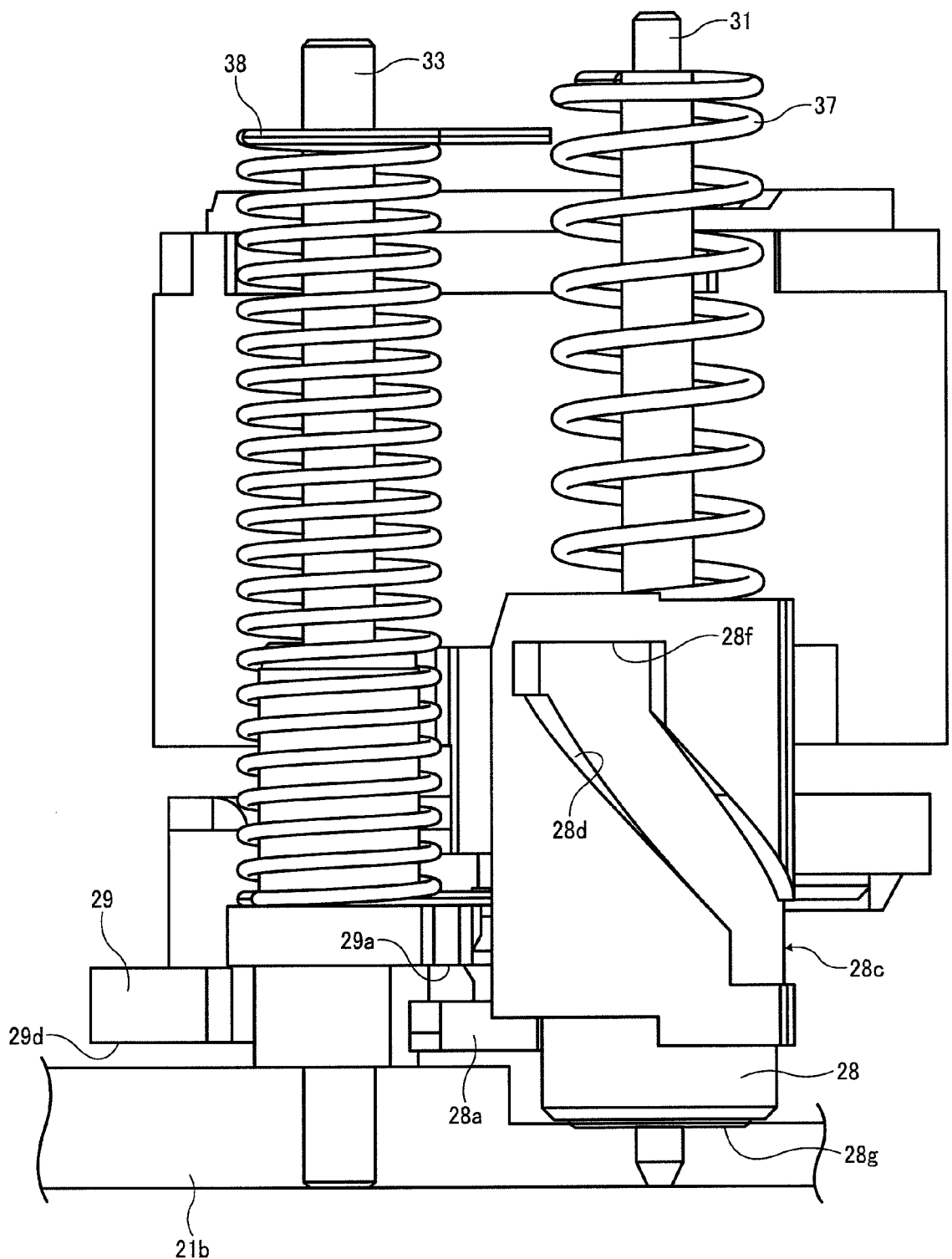
FIG. 3 is a side view of a drive mechanism for lens groups of the lens driver unit of FIG. 1, as seen from the right bottom side.
Figure 4:
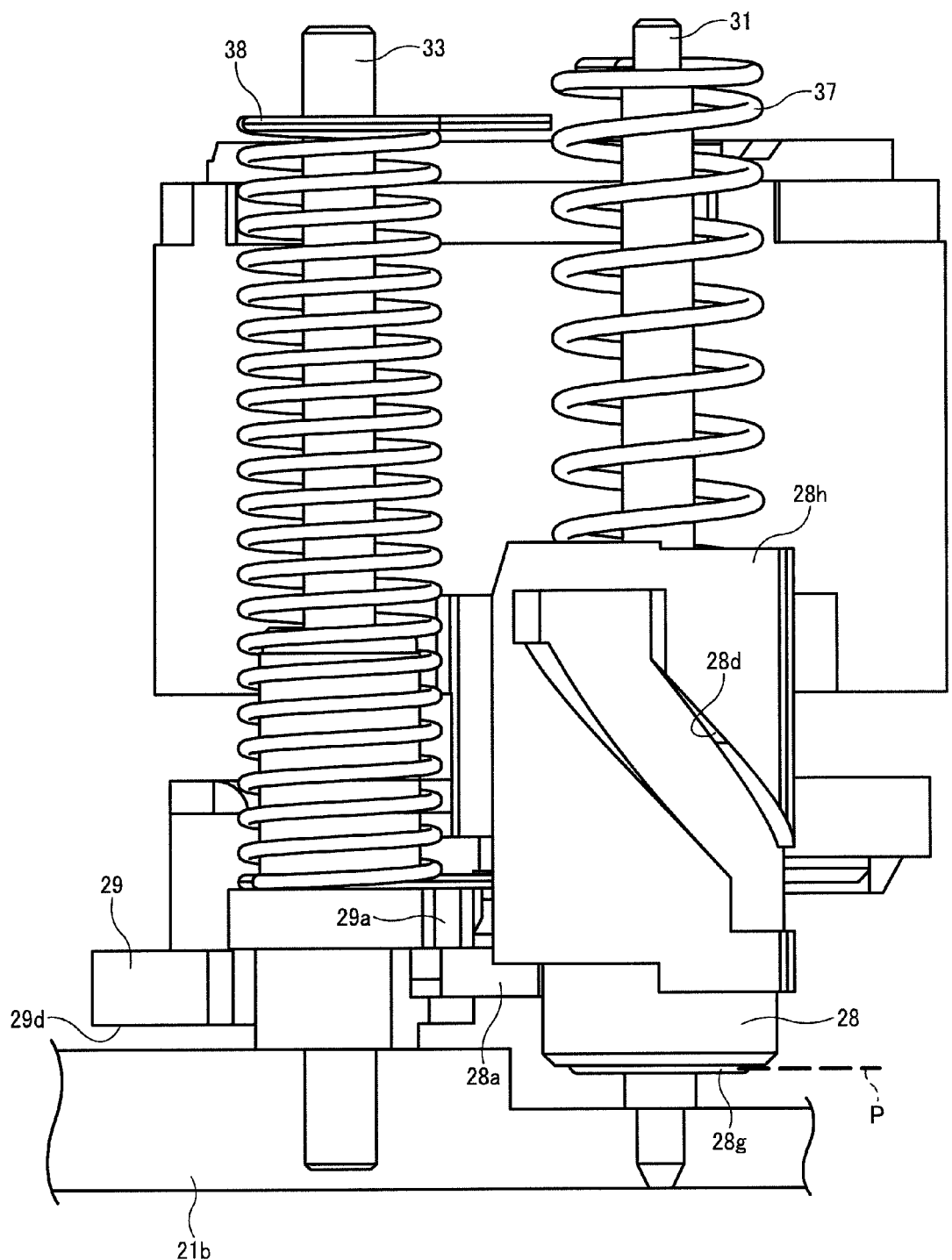
FIG. 4 is a side view of the drive mechanism of FIG. 3 in a different state.
Figure 5:
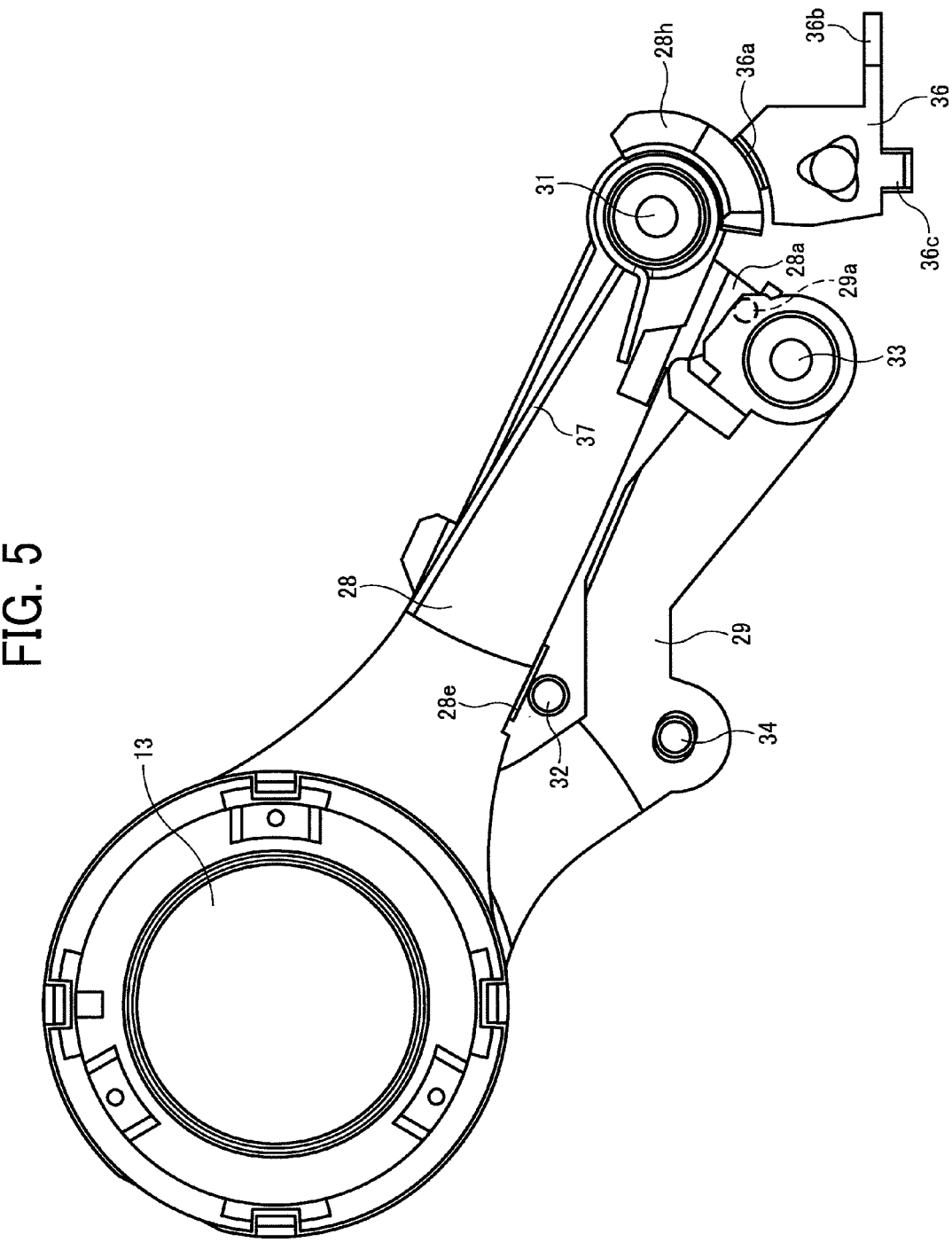
FIG. 5 is a front view of an essential part of the drive mechanism of FIG. 3, a third lens frame, a fourth lens frame, and a female screw engaged with each other, as seen from a subject side.
Figure 6:
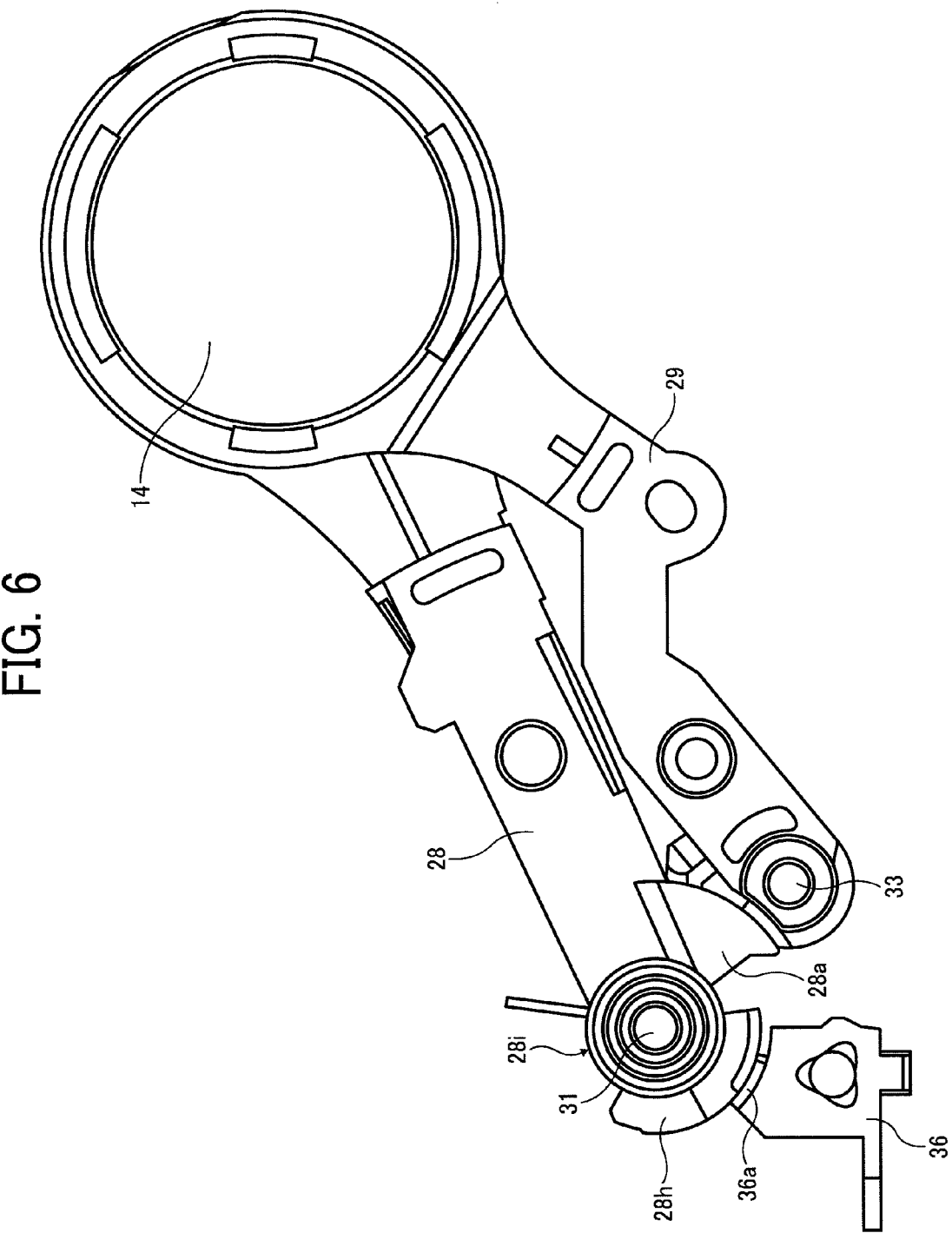
FIG. 6 is a back view of the same in FIG. 5.
Figure 7:
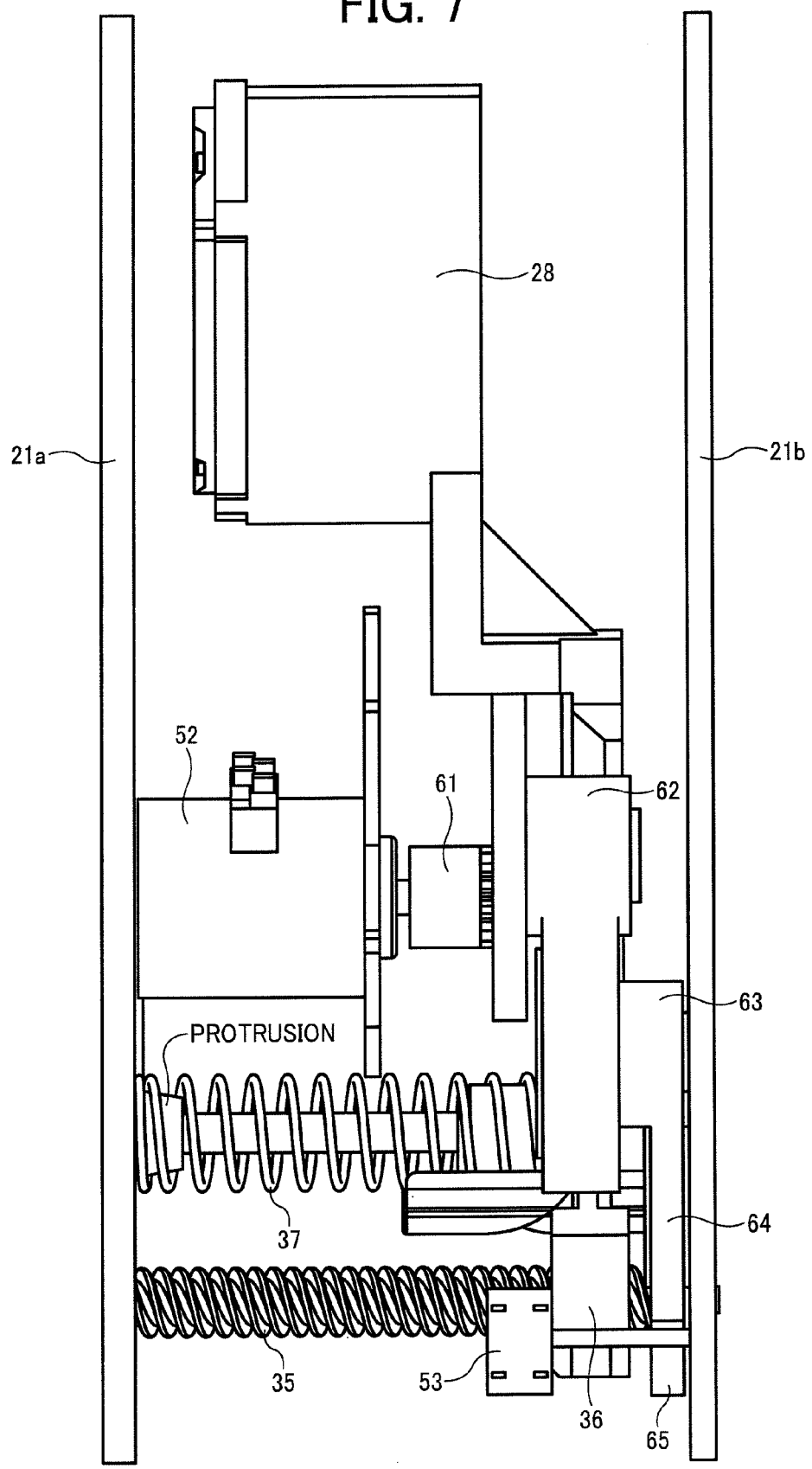
FIG. 7 shows details of a part of the drive mechanism of FIG. 3 as seen from the right side of FIG. 1.
Figure 8:
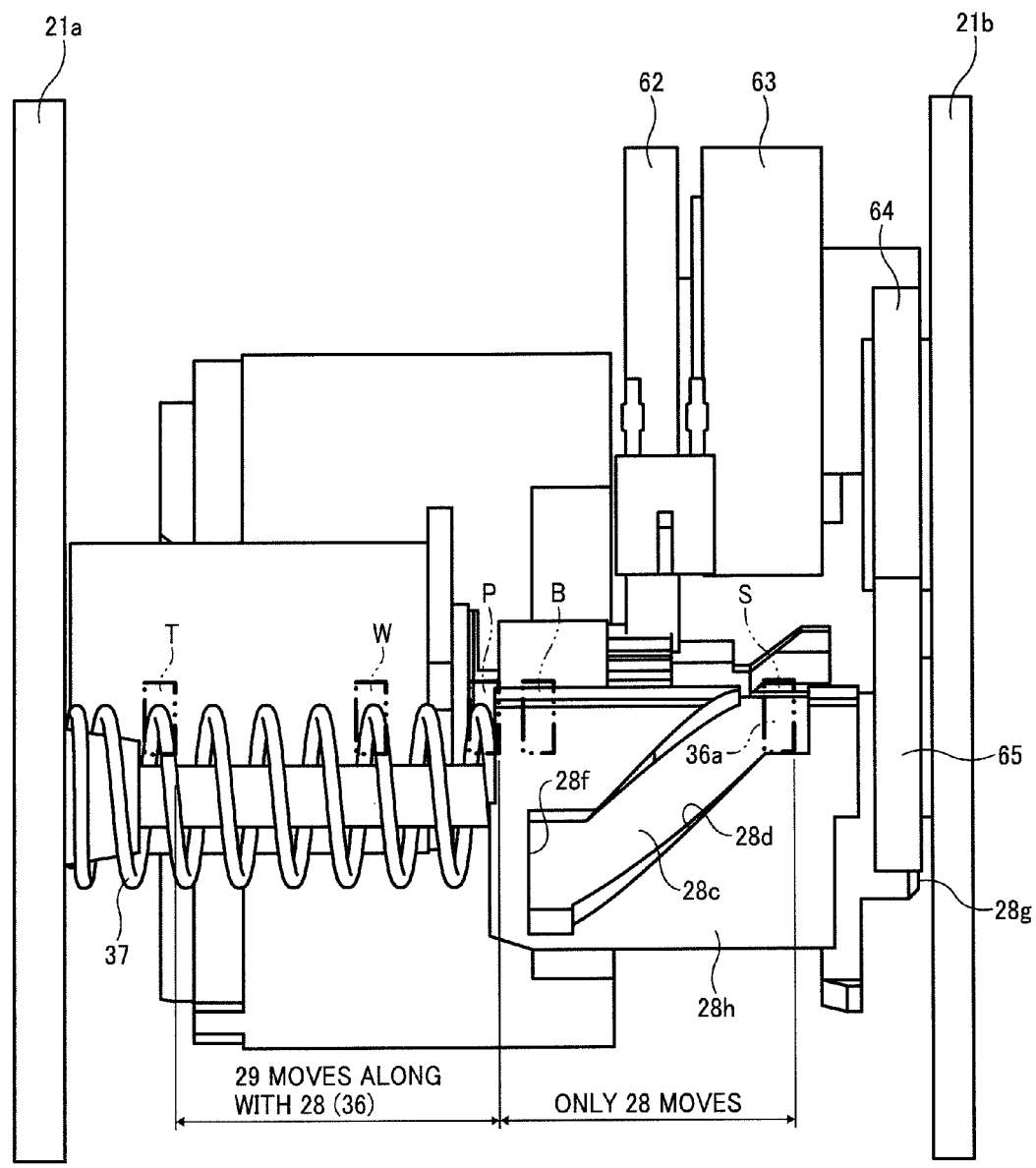
FIG. 8 is a side view of the same in FIG. 7 seen from downward.
Figure 9:
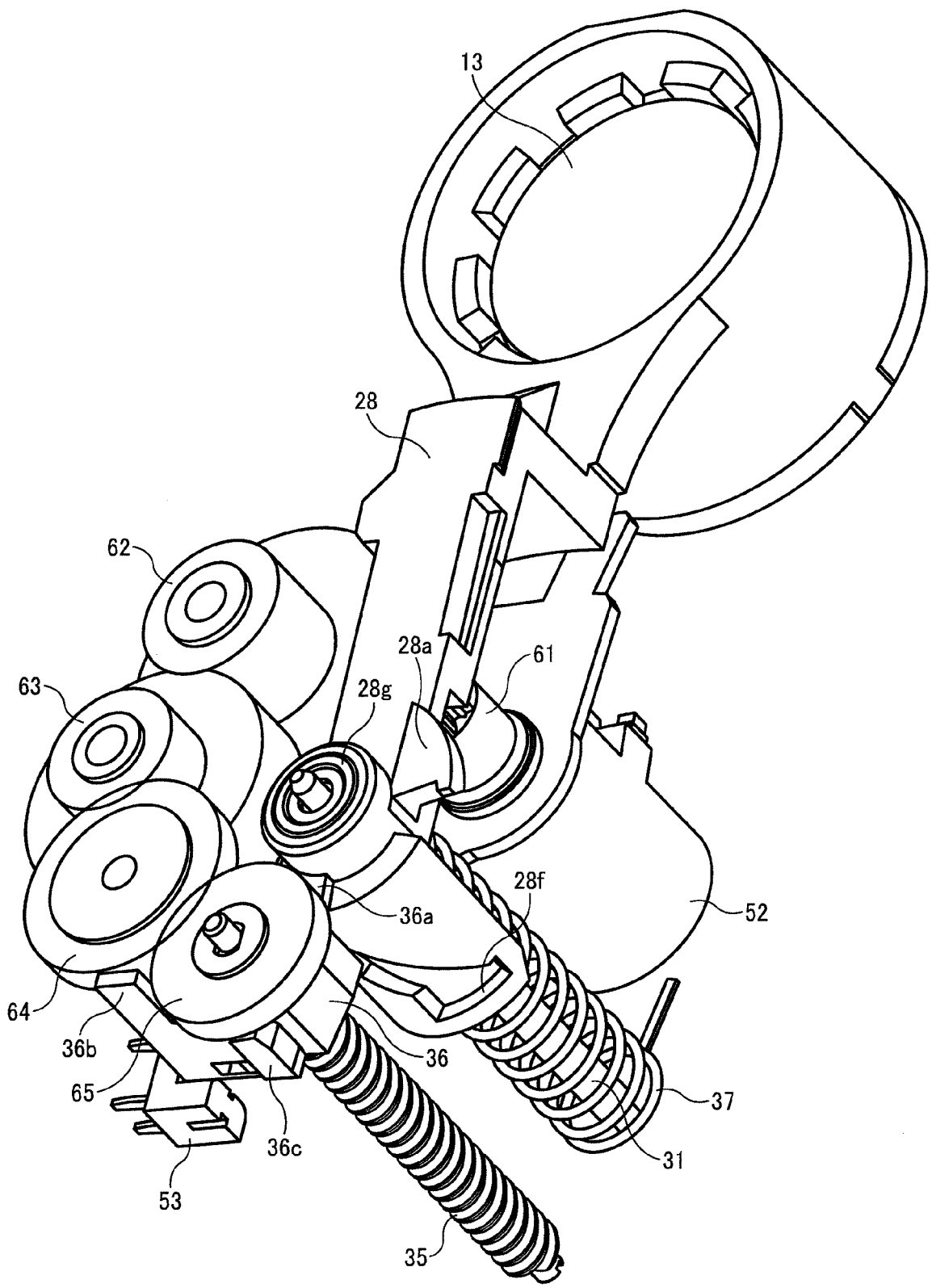
FIG. 9 is a perspective view of an essential part of the drive mechanism of FIGS. 7, 8 seen from left side of FIG. 7.

FIGS. 1 to 9 show the essential part of the lens driver unit according to the present embodiment. FIG. 1 is a perspective view of a lens barrel portion in a contained state according to a lens driver unit of one embodiment of the present invention, as seen from a subject side. FIG. 2A cross-sectionally shows a lens structure and an essential part of a lens barrel of the lens driver unit of FIG. 1 in a telephoto position (long focus) in the top half portion and in a contained position in the bottom half portion, and FIG. 2B shows the same in a wide angle position (short focus). FIG. 3 is a side view of a drive mechanism for lens groups of the lens driver unit of FIG. 1, as seen from the right bottom side. FIG. 4 is a side view of the drive mechanism of FIG. 3 in a different state. FIG. 5 is a front view of an essential part of the drive mechanism of FIG. 3, a third lens frame, a fourth lens frame, and a female screw engaged with each other, as seen from a subject side. FIG. 6 is a back view of FIG. 5. FIG. 7 shows details of a part of the drive mechanism of FIG. 3 as seen from the right side of FIG. 1. FIG. 8 is a side view of FIG. 7 seen from downward. FIG. 9 is a perspective view of an essential part of the drive mechanism of FIGS. 7, 8 seen from the left side of FIG. 7.

Figure 10:
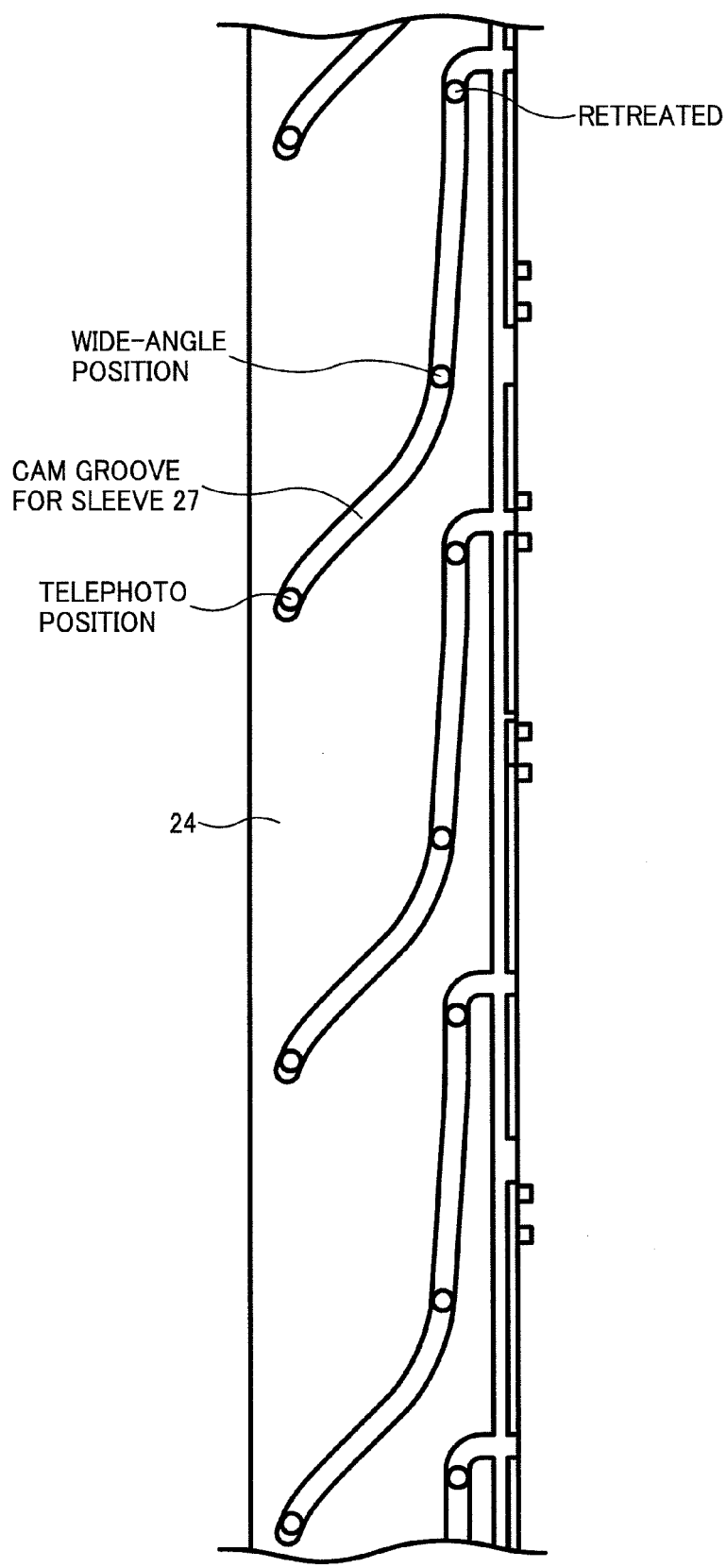
FIG. 10 is an exploded view of a second rotary sleeve of the optical system of FIG. 2.
Figure 11:
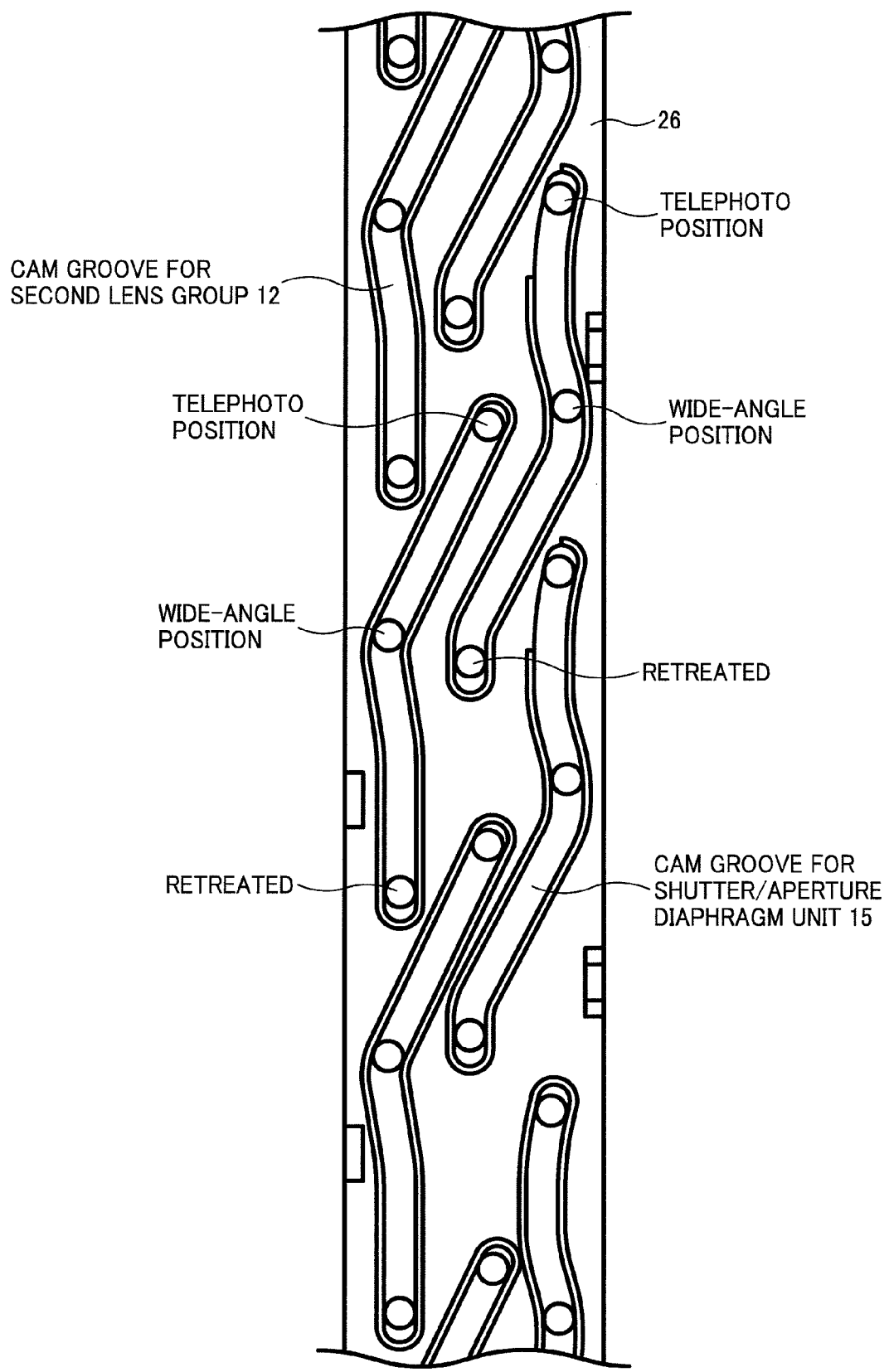
FIG. 11 is an exploded view of a cylindrical cam of the optical system of FIG. 2.
Figure 12:
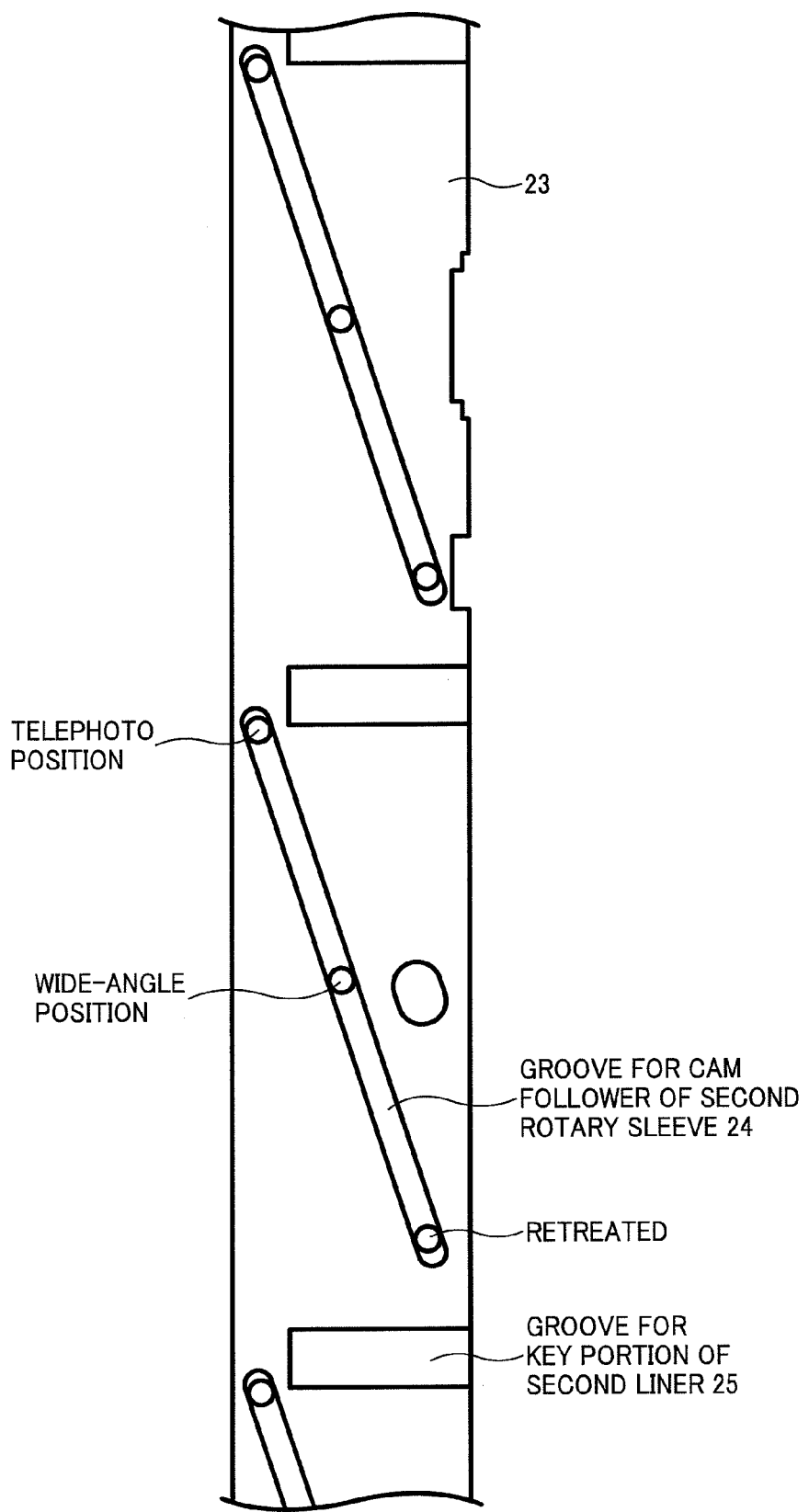
FIG. 12 is an exploded view of a first liner of the optical system of FIG. 2.
Figure 13:
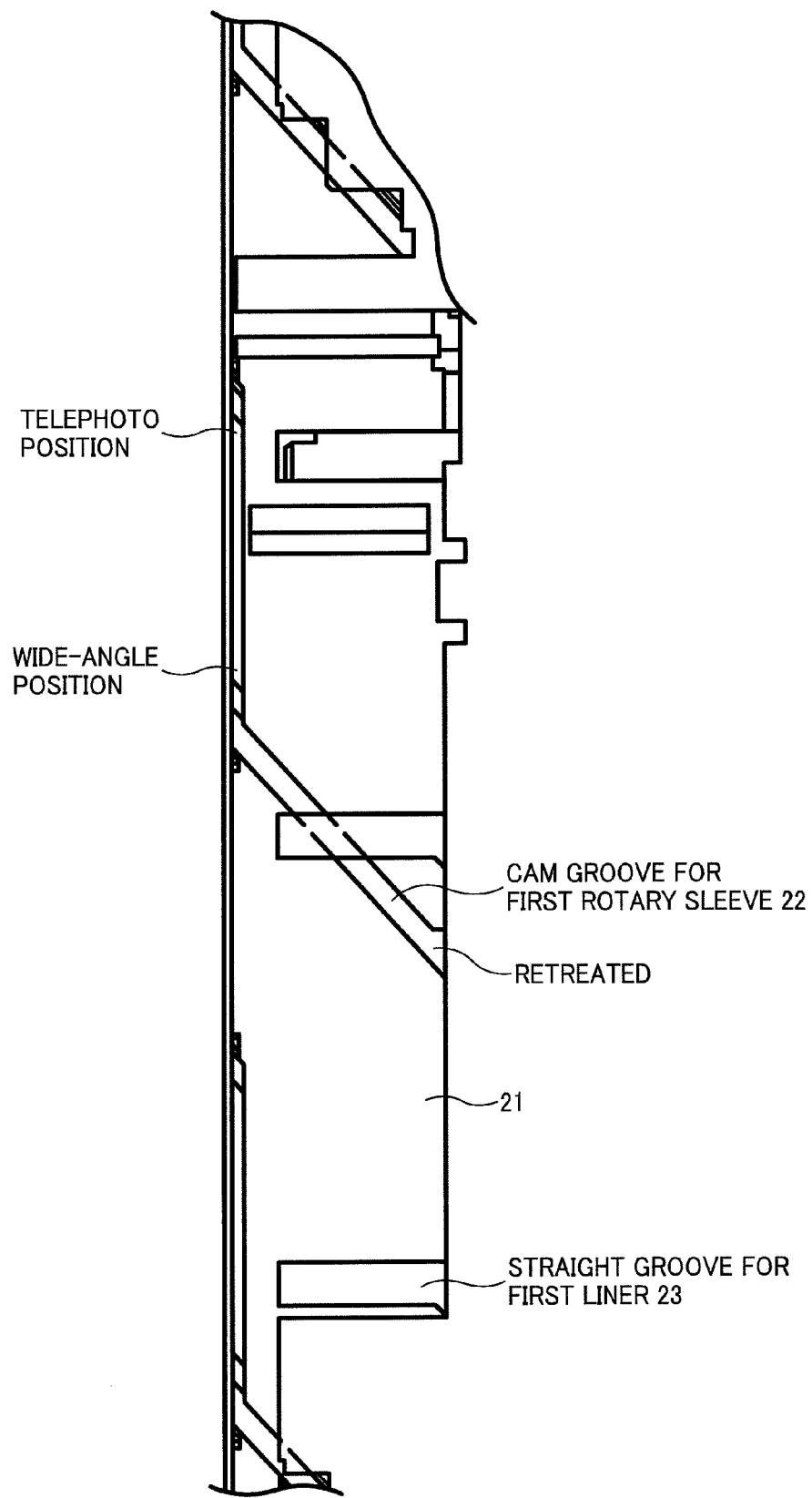
FIG. 13 is an exploded view of a fixed sleeve of a fixed frame of the optical system of FIG. 2.
Figure 14:
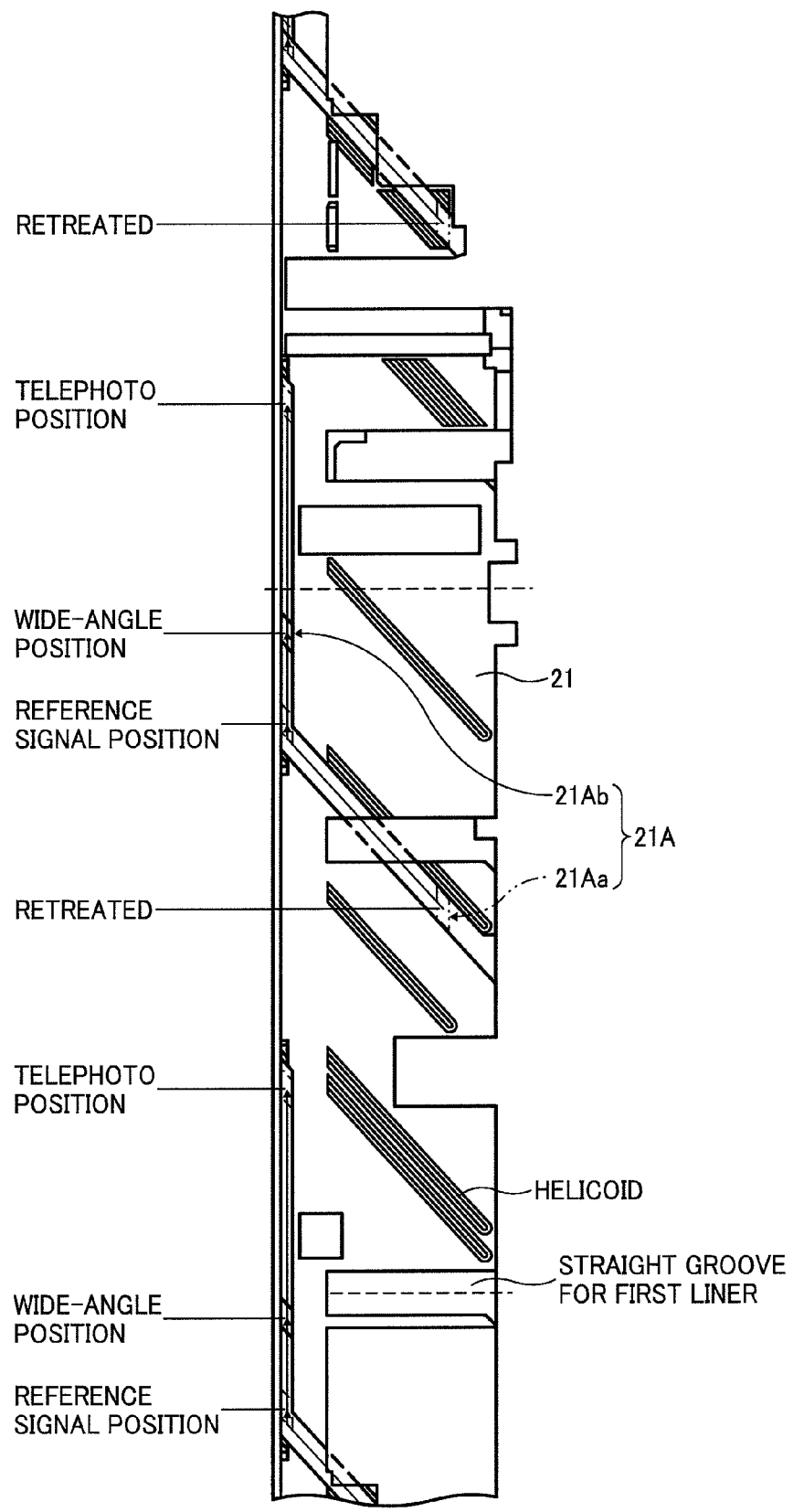
FIG. 14 shows details of the fixed sleeve of FIG. 13.

The lens driver unit with a lens barrel shown in FIG. 1 to FIG. 9 comprises a first lens group 11, a second lens group 12, a third lens group 13, a fourth lens group 14, a shutter/aperture diaphragm unit 15, a solid-state image sensor 16, a cover glass 18, a first lens frame 19, a second lens frame 20, a fixed frame 21, a first rotary sleeve 22, a first liner 23, a second rotary sleeve 24, a second liner 25, a cylindrical cam 26, a straight move sleeve 27, a third lens frame 28, a fourth lens frame 29, a third group main guide shaft 31, a third group sub guide shaft 32, a fourth group main guide shaft 33, a fourth group sub guide shaft 34, a lead screw 35, a female screw 36, a third group compression/torsion spring 37, a fourth group compression/torsion spring 38, a fixed frame 21, a zoom motor 51, a third group motor 52, a photo interrupter 53, a first gear 61, a second gear 62, a third gear 63, a fourth gear 64 and a fifth gear 65. Further, FIG. 10 is an exploded view of the second rotary sleeve 24, FIG. 11 is an exploded view of the cylindrical cam 26, FIG. 12 is an exploded view of the first liner 23, FIG. 13 is an exploded view of a fixed sleeve 21a of the fixed frame 21 and FIG. 14 show details of the fixed sleeve 21a in FIG. 13.

Figure 15:
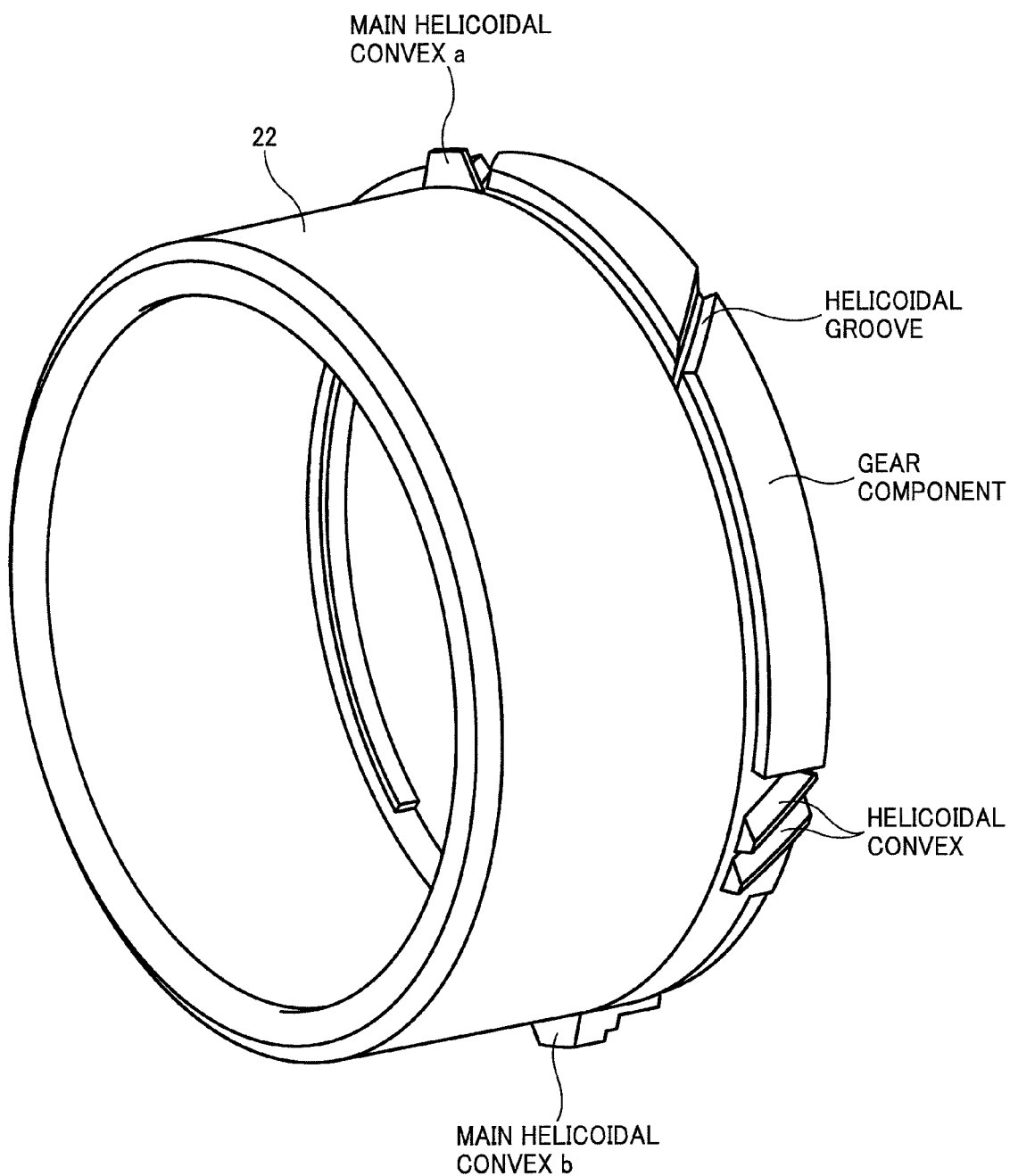
FIG. 15 is a perspective view of a first rotary sleeve of the optical system of FIG. 2.
Figure 16:
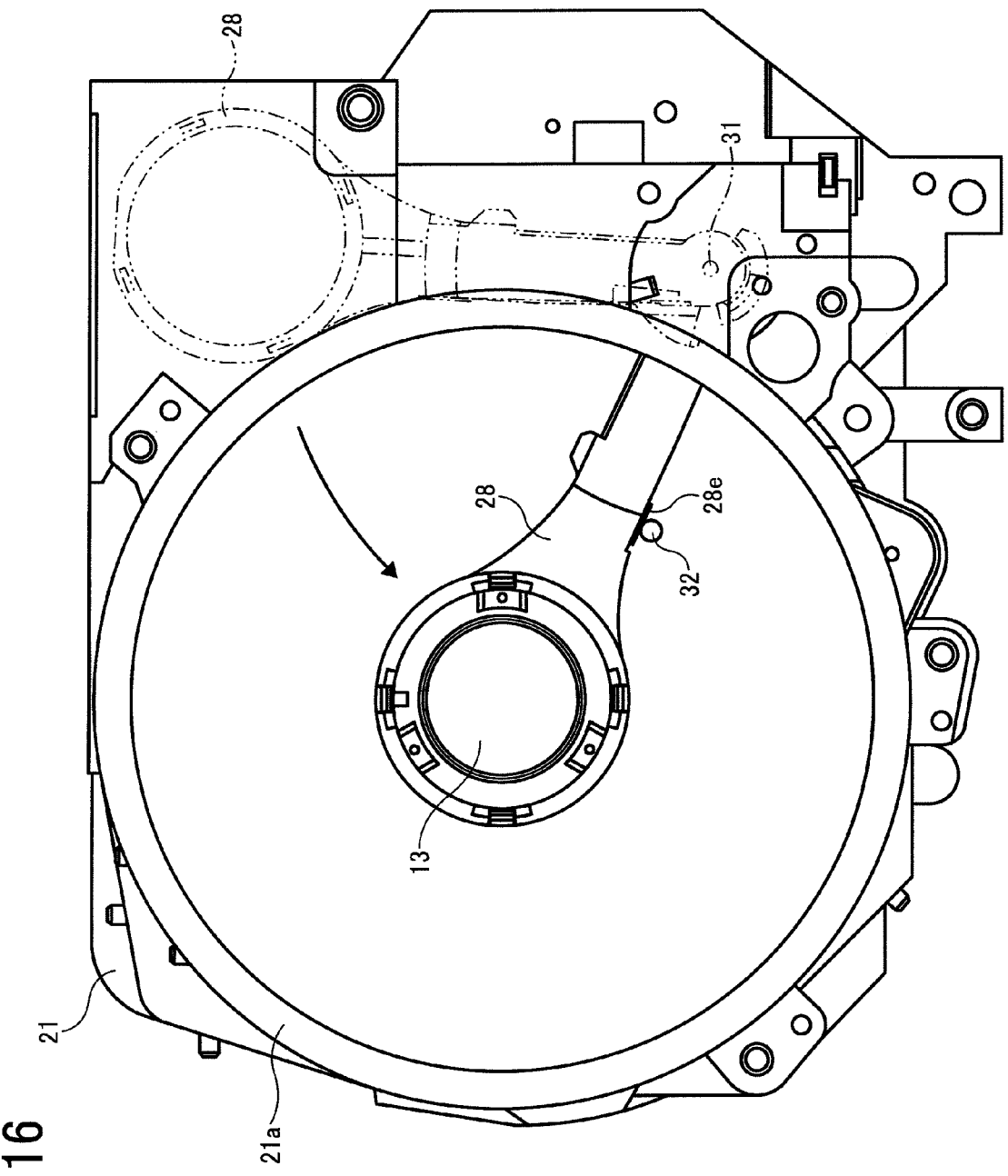
FIG. 16 is a front view of the third lens frame and the fixed sleeve of the fixed frame of the lens driver unit in FIG. 1.
Figure 17:
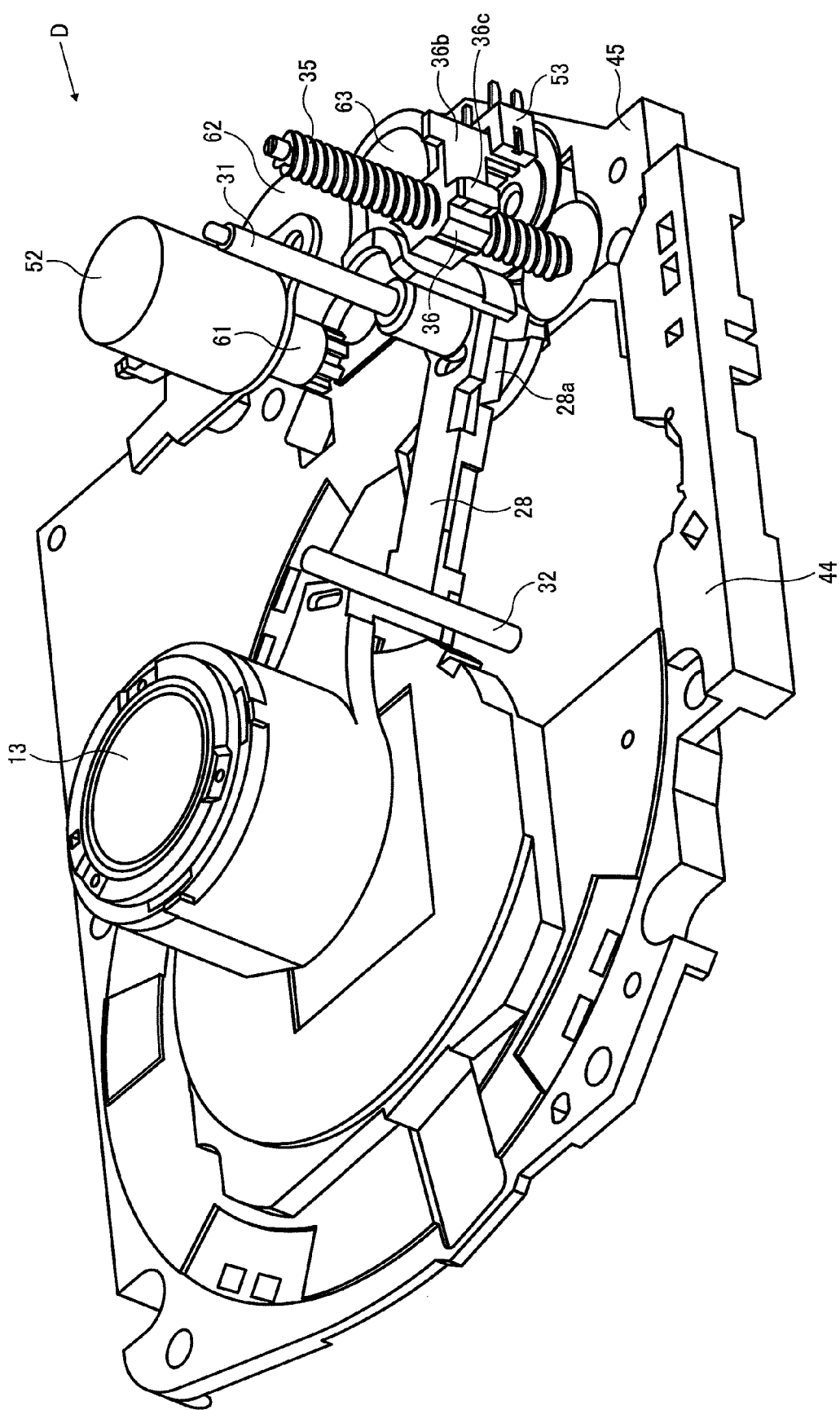
FIG. 17 is a perspective view of the periphery of the third lens frame and a drive unit when the third lens group is on the optical axis.
Figure 18:
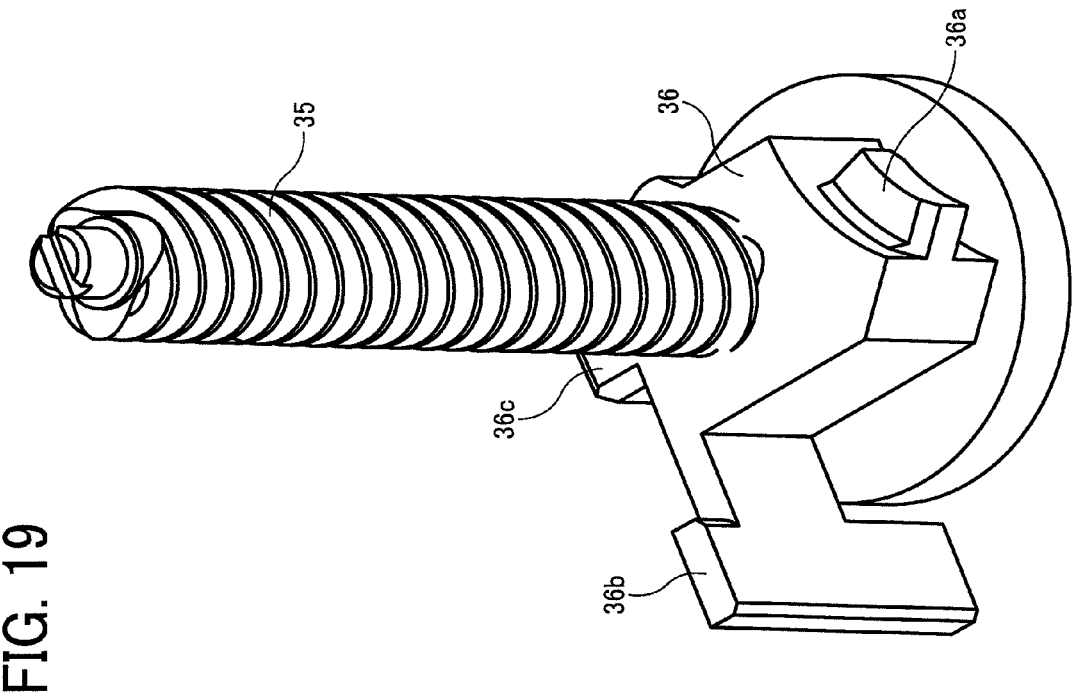
FIG. 18 shows details of a lead screw and a female screw of the lens driver unit in FIG. 1.
Figure 19:
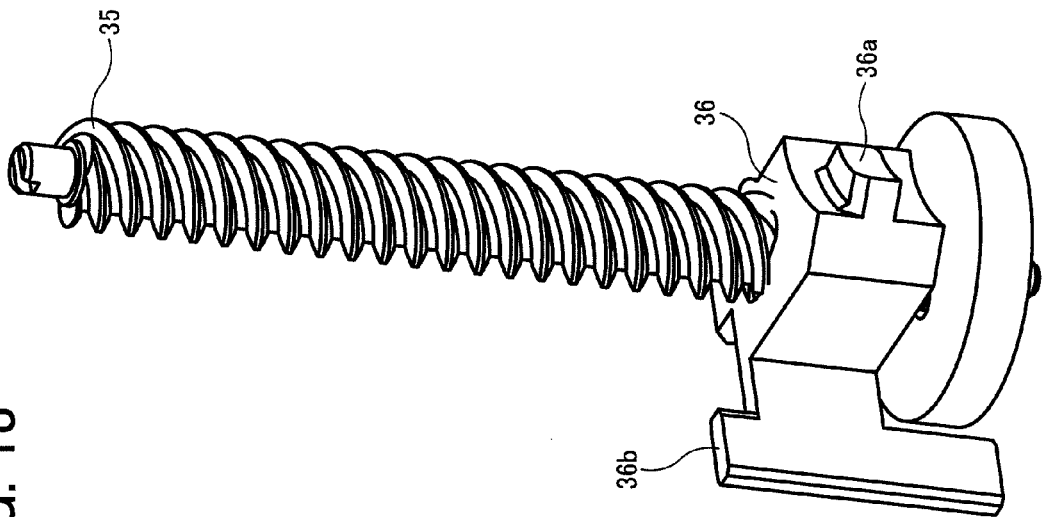
FIG. 19 shows the lead screw and female screw in FIG. 18 in a slightly different direction.
Figure 20:
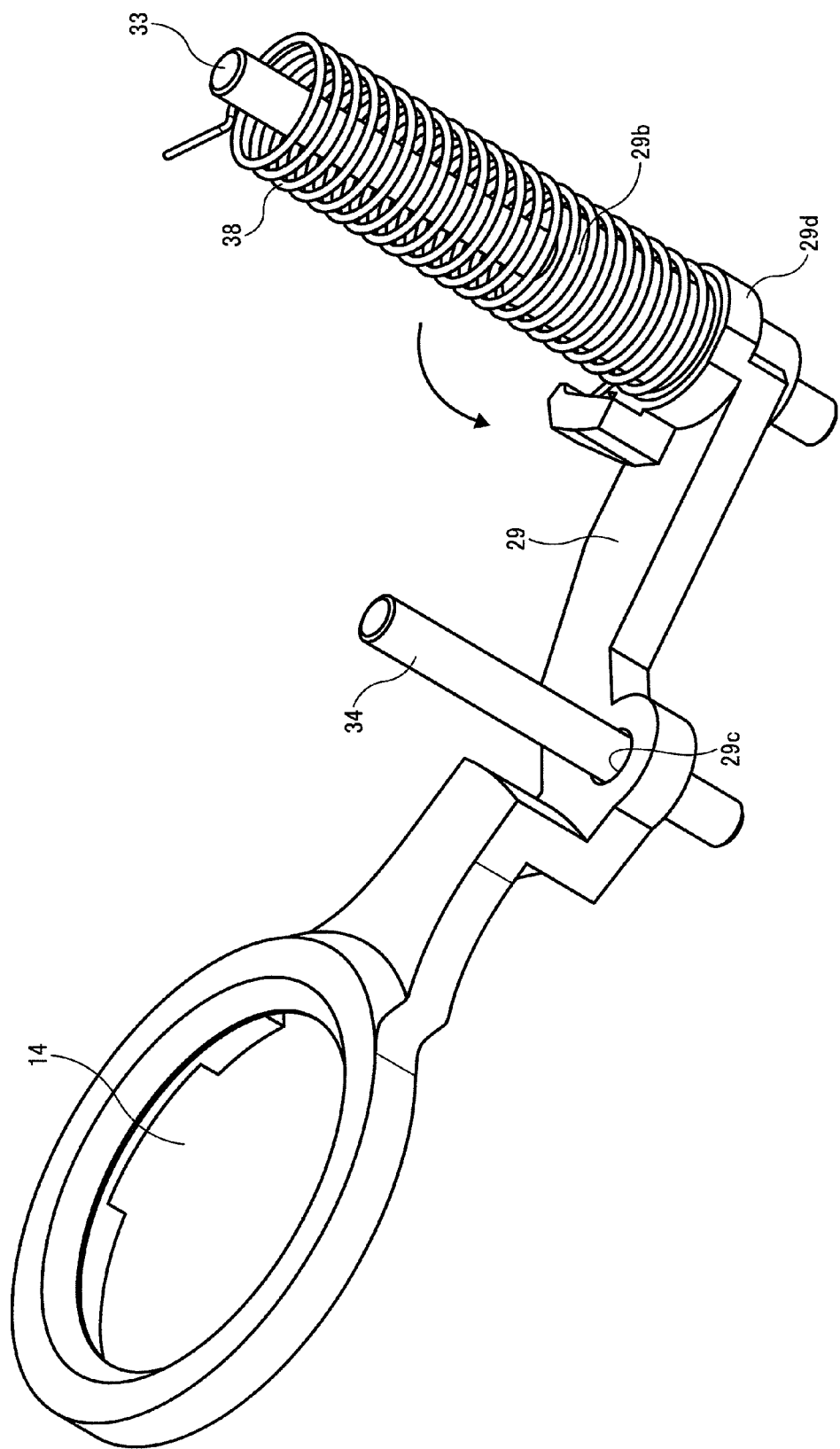
FIG. 20 is a perspective view of an essential part of a drive system for a fourth lens group of the lens driver unit of FIG. 1.
Figure 21:
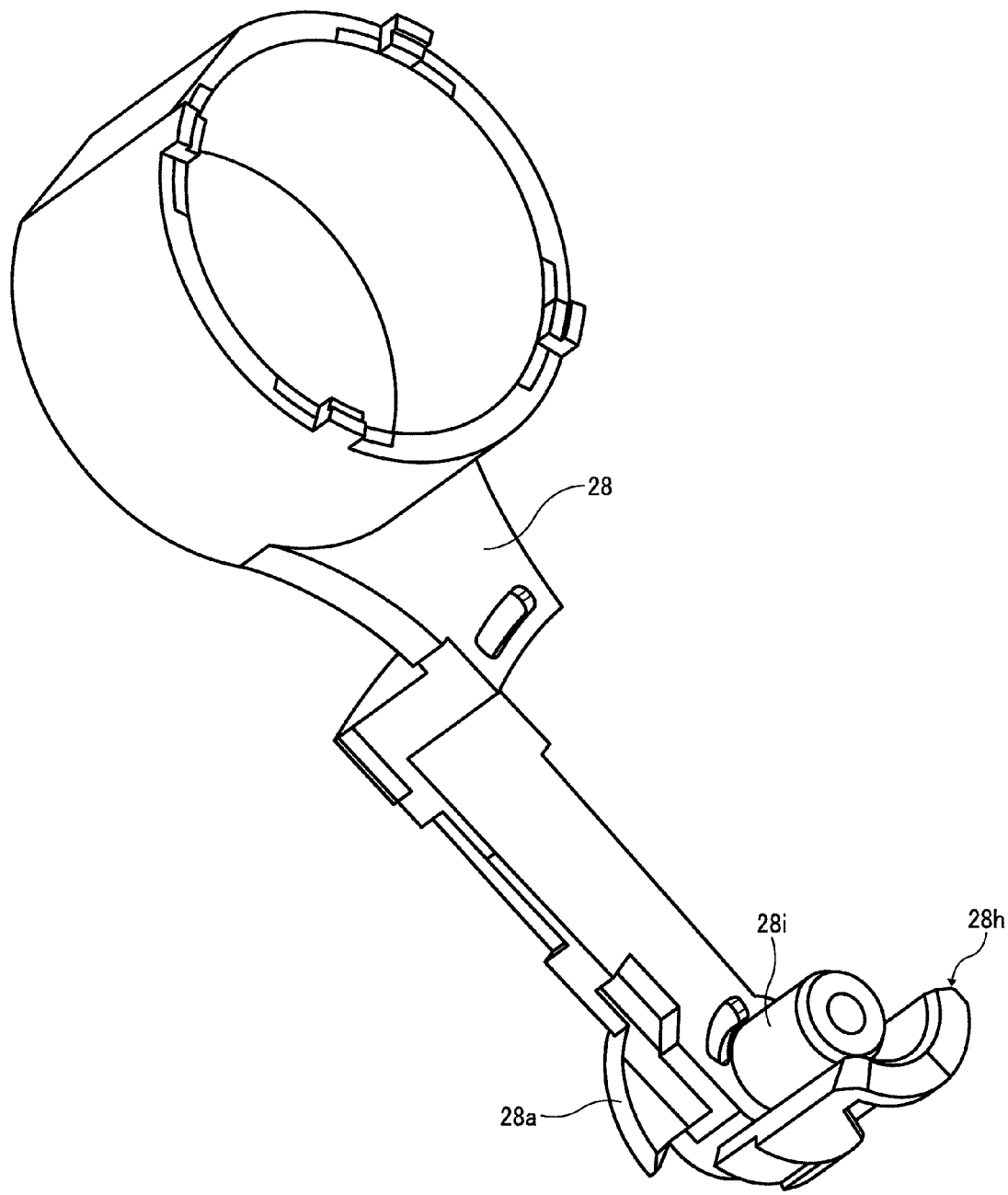
FIG. 21 shows a detailed structure of the third lens frame of the lens driver unit of FIG. 1.
Figure 22:
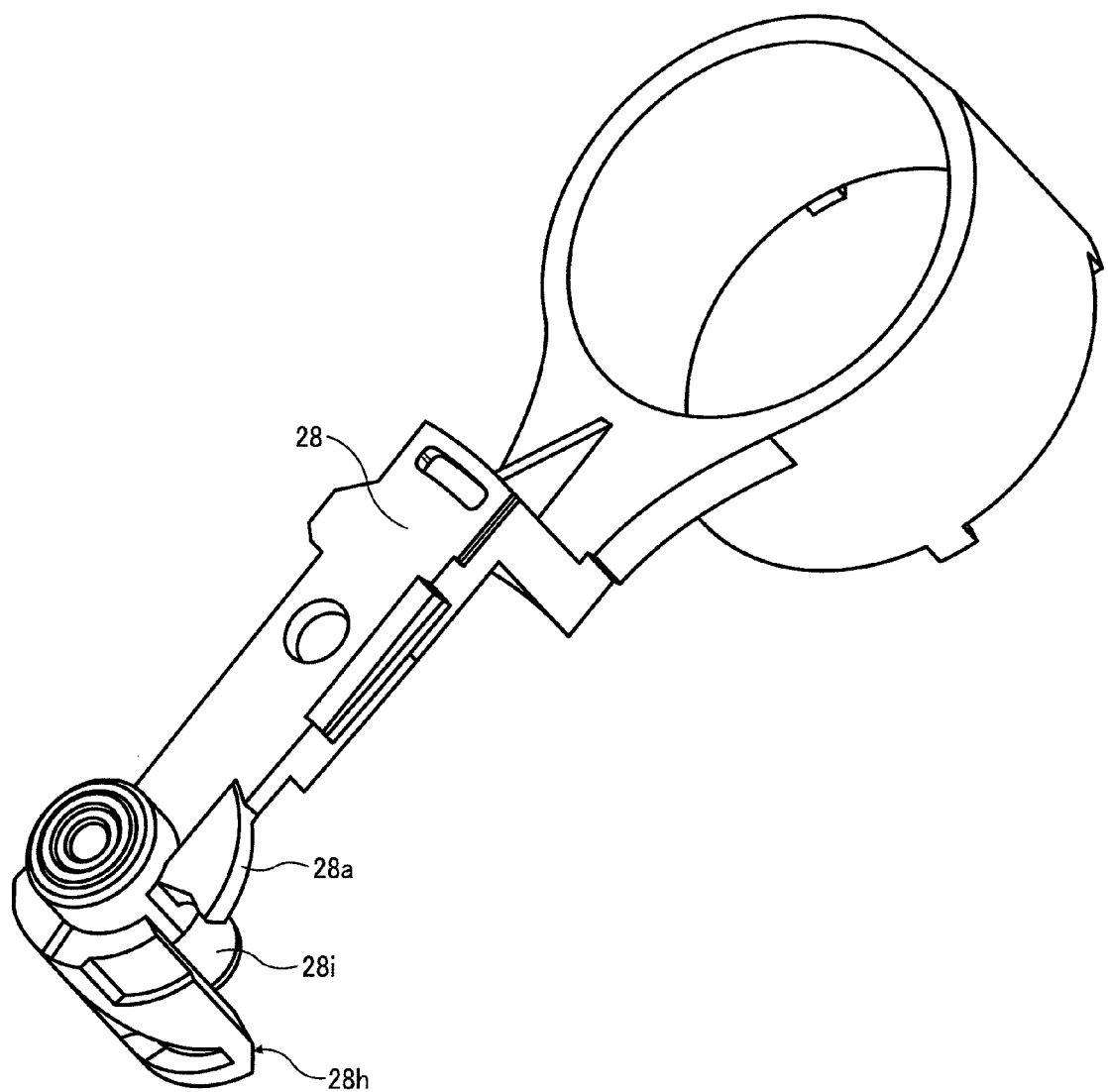
FIG. 22 shows a back side of the third lens frame of FIG. 21.
Figure 23:
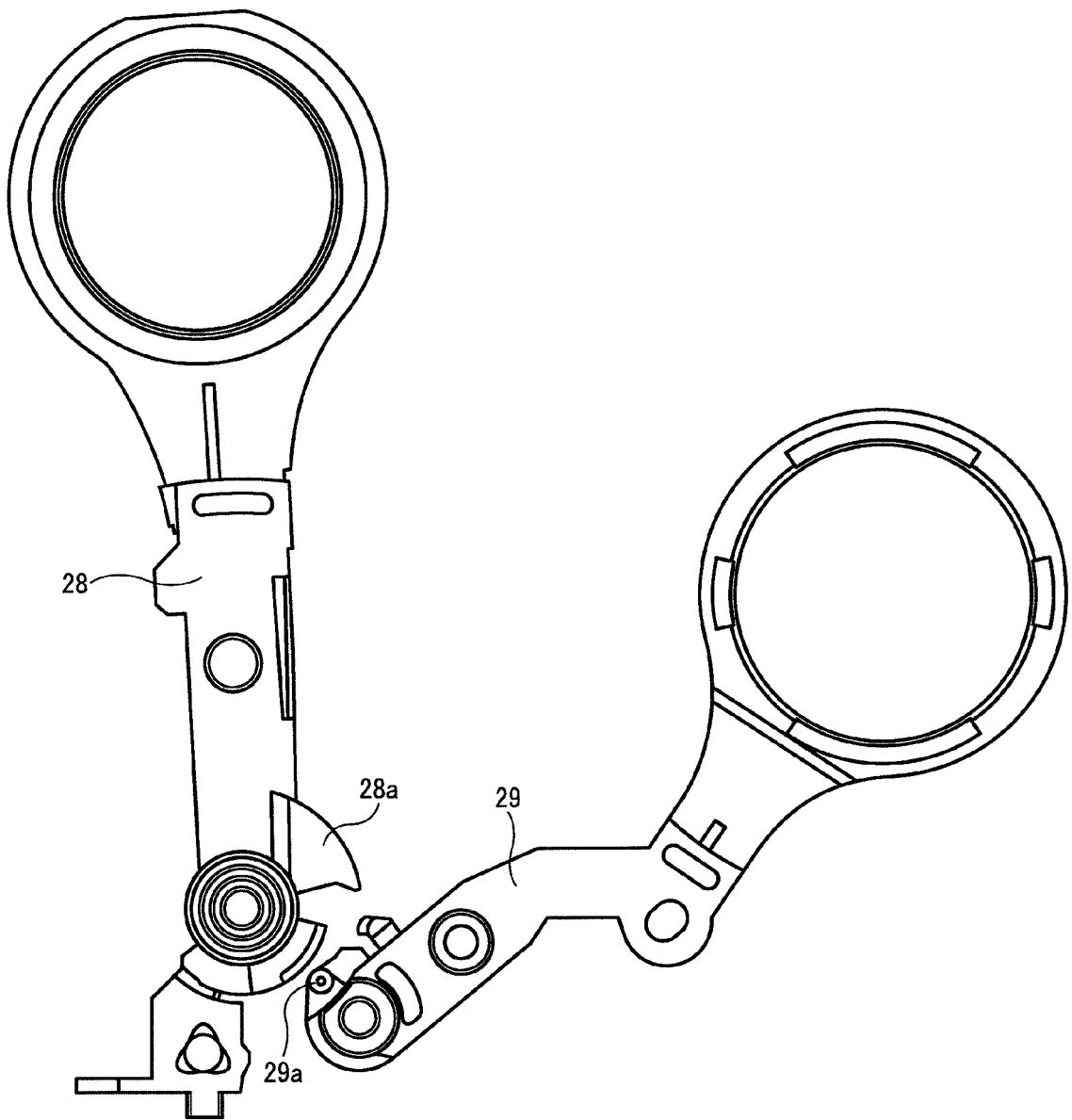
FIG. 23 is a bottom view of the third and fourth lens frames not engaged with each other, as seen from a base side of the fixed frame.
Figure 24:
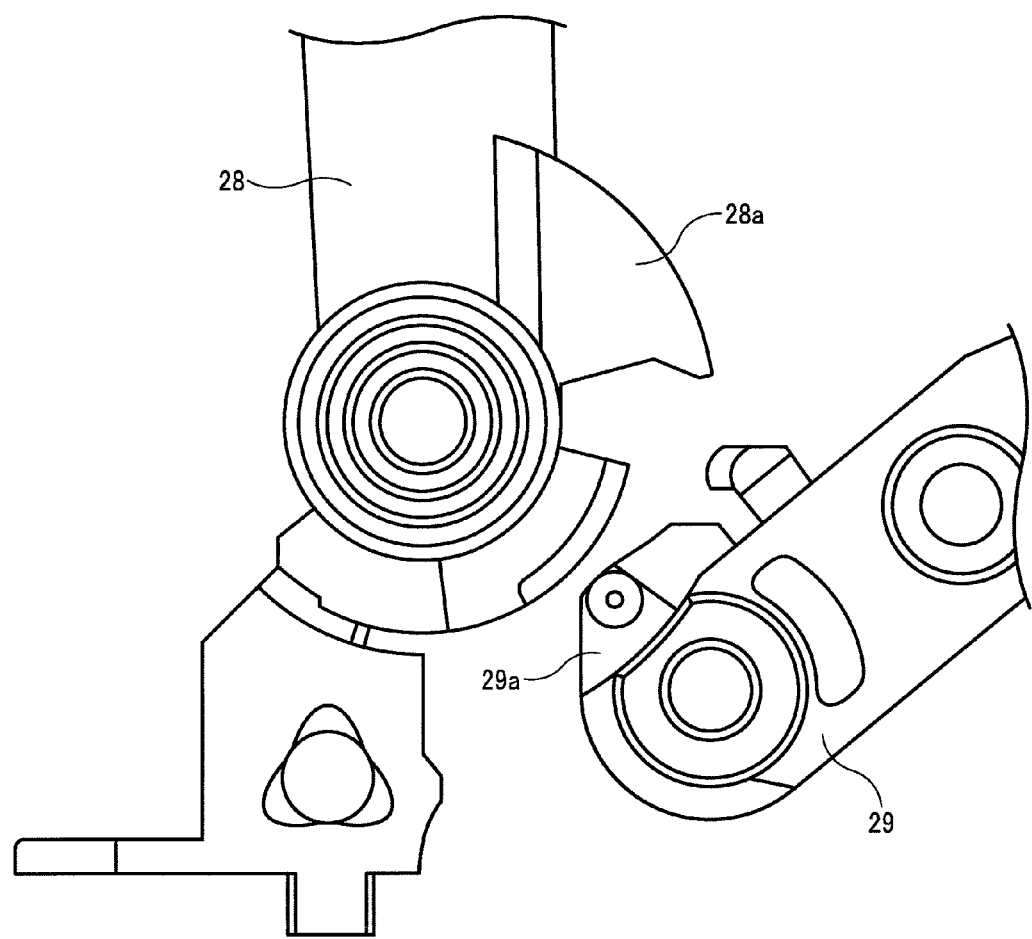
FIG. 24 shows details of an essential part of the third and fourth lens frames in FIG. 23.

FIG. 15 shows a perspective shape of the first rotary sleeve 22, FIG. 16 is a front view of the third lens frame 28 and the fixed sleeve 21a of the fixed frame 21, and FIG. 17 shows the periphery of the third lens frame 28 and a drive unit D when the third lens group 13 is on the optical axis. FIG. 18 shows details of the lead screw 35 and the female screw 36 in which the lead screw 35 is screwed and FIG. 19 shows the same in a different direction. FIG. 20 shows a drive mechanism for the fourth lens group 14. FIG. 21 shows the detailed structure of the third lens frame 28 and FIG. 22 shows the back side thereof. FIG. 23 shows the third lens frame 28 and the fourth lens frame 29 not engaged with each other seen from a base 21b of the fixed frame 21 and FIG. 24 shows details of an essential part of the same.

In FIG. 1 the lens barrel portion is in a contained state with the lens groups retracted into the lens barrel. The zoom motor 51 drives lens groups to adjust a focal length of the optical system to zoom a subject and the third group motor 52 drives the third lens group 13 and the fourth lens group 14.

In the top half of FIG. 2A the lens groups are protruded in a telephoto position and in the bottom half thereof the lens groups are retracted and contained while in FIG. 2B the lens groups are protruded in a wide-angle position. In FIG. 2A the first lens group 11, second lens group 12, third lens group (first lens group) 13, fourth lens group (second lens group) 14 are arranged in this order from a subject side. Between the second lens group 12 and the third lens group 13 the shutter/aperture diaphragm unit 15 is inserted. The solid-state image sensor 16 comprised of a CCD (charge coupled device) or a CMOS (complementary metal-oxide semiconductor) is disposed on an imaging plane side (opposite to the subject side) of the fourth lens group 14. The first to fourth lens groups 11 to 14 constitute a zoom lens.

The first lens group 11 is comprised of one or more lenses, integrally held in the first lens frame 19 and fixed with the straight move sleeve 27. The second lens group 12 is comprised of one or more lenses and integrally held in second lens frame 20 having a cam follower. By inserting the cam follower into a cam groove of the cylindrical cam 26 shown in FIG. 11 to fit it in a not-shown straight groove of the second liner 25, the second lens group 12 is supported by the cylindrical cam 26 and the second liner 25.

The shutter/aperture diaphragm unit 15 includes a cam follower and is supported by the cylindrical cam 26 and the second liner 25 with the cam follower inserted into the cam groove of the cylindrical cam 26 (FIG. 11) to fit in a straight groove of the second liner 25. The fixed sleeve 21a of the fixed frame 21 includes a helicoidal cam groove and a straight groove along the axis direction inside as shown in FIG. 13 and FIG. 14. A helicoidal cam follower (FIG. 15) on the outer circumference of a base end of the first rotary sleeve 22 is fitted into the helicoidal cam groove while a key portion protruded from the outer circumference of a base end of the first liner 23 is fitted into the straight groove of the fixed sleeve 21a.

The first rotary sleeve 22 includes a guide groove in a face orthogonal to the optical axis into which a follower (or a key) protruded from the outer circumference of a base end of the first liner 23 is fitted. The first liner internally includes a straight groove, a helicoid in the optical axis direction, and a groove through which a cam follower protruded from outer circumference of a base end of the first second rotary sleeve 24 is inserted. The helicoid of the second rotary sleeve 24 is engaged with a helicoid in an inner circumference of the first liner 23 while a cam follower thereof is fitted into a straight groove in an inner circumference of the first rotary sleeve 22 through a straight groove of the first liner 23. Also, a key portion protruded from outer circumference of the second liner 25 is fitted into the straight groove of the first liner 23. The second rotary sleeve 24 further includes a guide groove in a face orthogonal to the optical axis into which a follower (or key) of the second liner 25 is fitted. Thus, the second rotary sleeve 24 is configured to integrally move with the second liner 25 in the optical axis direction and to be able to rotationally move relative to the second liner 25.

The cylindrical cam 26 fitted into the inner periphery of the second liner 25 is integrally rotated with the second rotary sleeve 24 with a protrusion on outer circumference of a base end of the cam 26 fitted into a base end of the second rotary sleeve 24. The second liner 25 internally includes a guide groove in a face orthogonal to the optical axis into which a follower (or key) protruded from outer circumference (front side) of the cylindrical cam 26 is fitted. Thus, the cylindrical cam 26 is configured to integrally move with the second liner 25 in the optical axis direction and to be able to rotationally move relative to the second liner 25.

The straight move sleeve 27 is inserted between the second rotary sleeve 24 and the second liner 25 and includes a cam follower protruded on the outer circumference of a base end which is fitted into a cam groove in the inner circumference of the second rotary sleeve 24. It also includes a straight groove inside along the optical axis into which a key portion of the second liner 25 is fitted. A drive force of the zoom motor 51 is transmitted to a gear on the outer circumference of the first rotary sleeve 22 (FIG. 15) to move the first lens group 11, the second lens group 12, and the shutter/aperture diaphragm unit 15 for zooming.

The cam follower of the straight move sleeve 27 is fitted into the cam groove of the second rotary sleeve 24 shown in FIG. 10. The cam follower of the lens frame 20 of the second lens group 12 is fitted into the cam groove of the cylindrical cam 26 shown in FIG. 11. The cam follower of the shutter/aperture diaphragm unit 15 is fitted into the cam groove of the cylindrical cam 26 shown in FIG. 11. The cam follower of the second rotary sleeve 24 is fitted into the cam groove of the first liner 23 shown in FIG. 12. The key portion of the second liner 26 is fitted into the straight groove of the first liner 23 in FIG. 12. The key portion of the first liner 23 of the fixed sleeve 21a is fitted into the straight groove of the fixed sleeve 21a in FIGS. 13, 14 and the cam follower of the first rotary sleeve 22 is fitted into the cam groove of the fixed sleeve 21a shown in FIGS. 13, 14.

Generally, the first rotary sleeve 22 is closest to the fixed sleeve 21a as an outermost element and engaged therewith via the helicoid which moves the first rotary sleeve 22 at a certain speed. Therefore, the first rotary sleeve 22 is generally reeled out halfway in a wide-angle position while gradually moved from the contained position to the telephoto position. However, in the present embodiment the first rotary sleeve 22 is fitted into the helicoidal cam groove 21A of the fixed sleeve 21a, which is composed of an inclined groove 21Aa and a rotary groove 21Ab (FIG. 14) so that it is maximally reeled out in a wide-angle position. Then, since the rotary groove 21Ab is parallel to an end of fixed sleeve 21a of the fixed frame 21, the first rotary sleeve 22 is rotated at a fixed position without moving in the optical direction when moved from the wide-angle position to the telephoto position.

When moved from the contained position to the wide-angle position, the first rotary sleeve 22 is reeled out in rotation towards a subject side and reaches the maximum position. A not-shown zoom position detector provided in the fixed frame 21 detects the first rotary sleeve 22 being in the maximum position and generates a zoom position reference signal. The zoom position detector is comprised of a photo reflector, a photo interrupter, a leaf switch or the like. Upon generation of the zoom position reference signal, the third lens frame 28 as a retreat lens frame starts moving the third lens group 13 from a retreat position to a position on the optical axis.

The third lens group 13 is held at one end of the third lens frame 28 (first lens frame) which includes a bearing 28i at the other end. The third lens group 13 is rotatable around a third group main guide shaft 31 (first guide element) which is substantially parallel to the optical axis of the third lens group and inserted into the bearing 28i, and it is slidable along the third group main guide shaft 31. In an imaging state the third lens frame 28 supporting the third lens group is on the optical axis while in a contained state it is contained in the fixed sleeve 21a without the third lens group, as shown in FIG. 16. The third lens frame 28 is turned around the third group main guide shaft 31 between the position on the optical axis (top half of FIG. 2A and FIG. 2B) and the retreat position (bottom half of 2A) outside the fixed sleeve 21a of the fixed frame 21. FIG. 16 shows movement of the third lens frame 28 and a positional relation of the third lens frame 28 and the fixed sleeve 21a of the fixed frame 21.

As shown in FIGS. 7 to 9, while the third lens frame 28 is in the retreat position (indicated by a broken line in FIG. 16), a female screw (engaging element) together with the lead screw 35 is closest to an imaging plane (opposite to a subject side). Due to a force of the third group compression/torsion spring 37 to a rotary direction, a counterclockwise (moving direction to the optical axis) moment is constantly given to the third lens frame 28. In the retreat position the spring force to the rotary direction is most accumulated. A partially cylindrical sleeve 28h is formed on a part of the outer circumference (FIG. 8) of the bearing 28i holding the third group main shaft 31. On the outermost circumference of the sleeve 28h provided is a step 28c (second engaging portion) which includes an inclined cam face 28d in a middle portion in a direction parallel to the axial line of the third group main guide shaft 31 as a rotary shaft. An abutment 36a of the female screw 36 is engaged with the step 28c in a retreat position S in FIG. 8. Clockwise rotation of the third group motor 52 rotates the lead screw 35 clockwise in FIG. 9 via a gear mechanism of the first to fifth gears 61 to 65, moving the female screw 36 from the retreat position S to the subject side in the optical axis direction.

Given a moment from the third group compression/torsion spring 37, the abutment 36a of the female screw 36 engaged with the cam face 28d is slid along the cam face 28d, rotating the third lens frame 28 counterclockwise. When the female screw 36 is continuously moved and a light blocking portion 36b thereof moves off the optical path of the photo interrupter 53 as a position detector, the photo interrupter 53 generates a reference signal which changes from low level (L) to high level (H). The position of the third lens group 13 is controlled by pulse counts from the reference signal from the photo interrupter 53. Then, when the female screw 36 is moved to a retreat start position B in FIG. 8, the third lens frame 28 is rotated counterclockwise to make a stopper 28e in the middle portion thereof abut with the third group sub guide shaft 32 (third guide element) as shown in FIGS. 5, 16, defining a position of the third lens frame 28 on the optical axis and placing the third lens group 13 on the optical axis. This completes moving of the third lens group 13 to the optical axis. Note that the light blocking portion 36b of the female screw 36 is configured to shade the photo interrupter 53 in FIG. 9 to allow it to detect that the third lens group is in the contained position.

In the retreat start position B, the abutment 36a of the female screw 36 is engaged with a front engaging portion 28f (second engaging portion) of the step 28c of the third lens frame 28. The front engaging portion 28c is a planar face with which the third group main guide shaft 31 substantially intersects. Thus, the step 28c is configured to include the inclined cam face in the middle portion and the front engaging portion 28f at a front end to form a depression in the cylindrical circumference. The third lens frame 28 is biased by the compression/torsion spring 37 provided around the third group main guide shaft 31 to turn from the retreat position to the optical axis position, and at the same time it is constantly biased from the subject side to the base 21b of the fixed frame 21 on the imaging plane side. The fixed sleeve 21a faces the base 21b and is integrated with the fixed frame 21. As shown in FIG. 7, the fixed sleeve 21a is provided with a protrusion with a diameter smaller than that of the compression/torsion spring 37 in the vicinity of a portion abutting with the compression/torsion spring 37 to define the position of the compression/torsion spring 37 and prevent the center thereof from largely displacing from the center of the third group main guide shaft 31.

Next, moved to a wide-angle position W in FIG. 8, the abutment 36a of the female screw 36 is engaged with the front engaging portion 28f and pushes it to thereby move the third lens frame 28 to the wide-angle position in the optical axis direction. Also, while moved from the retreat start position B to a telephoto position T in FIG. 8, the female screw 36 is constantly pushed towards the imaging plane side in the optical axis direction. This can prevent wobbles or gaps occurring between the fixed sleeve 21a and the lead screw 35, female screw 36, or else and secure positional accuracy of the third group lens frame 28 in the optical axis direction.

Further, in order to prevent the female screw 36 from turning along with the rotation of the lead screw 35, the female screw 36 also includes a rotary stopper 36c (FIG. 5, FIG. 9, FIG. 17) which is fitted in and slid with a guide of the fixed frame 21 parallel to the optical axis direction. Thus, the female screw 36 is inhibited from rotating with the fitting of the rotary stopper 36c and the guide of the fixed frame 21 so that it can be moved forward and backward along the optical axis by the rotation of the lead screw 35.

Meanwhile, reverse (counterclockwise) rotation of the lead screw 35 moves the female screw 36 from the telephoto position T to the wide-angle position W and the retreat start position B. Since the abutment 36a of the female screw 36 is engaged with the front engaging portion 28f of the step 28c of the third lens frame 28, the third lens frame 28 is gradually moved from the subject side to the imaging plane side by the bias force from the compression/torsion spring 37 to the optical axis direction and to the imaging plane while maintaining the optical axis position defined by the third group sub guide shaft 32. When the female screw 36 reaches the retreat start position 13 in FIG. 8, a bottom end of the third lens frame 28 abuts with the base 21b and the female screw 36 is moved away from the front engaging portion 28f to abut with the cam face 28d of the step 28c. Further, while the female screw 36 is moved from the retreat start position B to the retreat position S, the abutment 36a is slid with the cam face 28d of the step 28c to turn the third lens frame 28 against the bias force of the compression/torsion spring 37 from the optical axis position to the retreat position. As shown in FIG. 8 in detail, when moved beyond the retreat start position to the imaging plane side (rightward in the drawing), the female screw 36 (abutment 36a) cannot move further to the imaging plane side since the third lens frame 28 abuts with the base 21b of the fixed frame 21 due to the bias force of the compression/torsion spring 37 towards the imaging plane along the optical axis. Therefore, sliding along the cam face 28d of the step 28c of the third lens frame 28, the female screw 36 rotates the third lens frame 28 clockwise against counterclockwise bias force of the compression/torsion spring 37 to the retreat position.

The movement of the third lens frame 28 to the retreat position S is defined by a predetermined number of pulses counted from generation of the reference signal from the photo interrupter 53. After the third lens frame 28 is moved to the retreat position S, the first and second lens groups 11, 12 and the shutter/aperture diaphragm unit 15 are moved to be contained in the fixed sleeve 21a. Further, the lead screw 35 is rotated forwardly and reversely by the third group motor 52. Rotation of the third group motor 52 is transmitted to the lead screw 35 via the gears 61 to 65 in order.

Next, the fourth lens group 14 (second lens group) will be described. A drive mechanism for the fourth lens group 14 is shown in FIG. 20. The fourth lens group 14 is held in the fourth lens frame 29 (second lens frame) which comprises a sleeve 29b and a rotary stopper (third guide element) 29c as a shaft hole. A fourth group main guide shaft 33 (second guide element) fixed on the base 21b of the fixed frame 21 in parallel to the optical axis is inserted into the sleeve 29b. A fourth group sub guide shaft 34 (third guide element) is fixed on the base 21b of the fixed frame 21 in parallel to the optical axis. The rotary stopper 29c through which the fourth group sub guide shaft 3 is inserted is configured to restrict rotation of the fourth lens frame 29 relative to the fourth group main guide shaft 33. As configured above, the fourth lens frame 29 is freely movable along the fourth group main guide shaft 33 in the optical axis direction. Also, the fourth lens frame 29 is constantly given a bias force to the imaging plane side and a counterclockwise rotary force from the fourth group compression/torsion spring 38 in FIG. 20.

The features of the present embodiment of the invention are described with reference to mainly FIG. 3 to FIG. 8. The third lens frame 28 includes an engaging portion 28a (first engaging portion) while the fourth lens frame 29 includes an engaging portion 29a (third engaging portion). As shown in FIG. 5 and FIG. 6, the engaging portion 28a of a fan-like plate protrudes from the bottom end of the third lens frame 28 near the bearing 28i into which the third group main guide shaft 31 is inserted and on the side closer to the fourth group main guide shaft 33 (FIG. 21 to FIG. 24). As shown in FIG. 6, the engaging portions 28a, 29a overlap with each other in the imaging state seen from the optical axis while they do not overlap with each other in the contained state. Because of this, the fourth lens frame 29 can be integrally movable with the third lens frame 28 along with the movement of the third lens frame 28 along the optical axis in the imaging state. And, in the contained state, without the engaging portions 28a, 29a interfering with each other, the fourth lens frame 29 is movable to the retreat position without interfering with the third lens frame 28. The plate-like engaging portion 29a of the fourth lens frame 29 protrudes from the bottom end thereof near the sleeve 29b into which the fourth group main guide shaft 31 is inserted and on the side closer to the third group main guide shaft 31 (FIGS. 23, 24), to engage with the engaging portion 28a. As configured above, the engaging portions 28a, 29a are engaged with each other at a position P while the third lens frame 28 is moved from the retreat start position B to the wide-angle position W. By the engagement of the engaging portion 28a and the engaging portion 29a, the fourth lens frame 29 is moved integrally with the third lens frame 28 in the optical axis direction along with the movement of the third lens frame 28 while the third lens frame 28 is moved from the position P to the telephoto position T. As described above, the fourth lens frame 29 is given a bias force from the fourth group compression/torsion spring 38 to the imaging plane so that it can move together with the third lens frame 28.

Meanwhile, when the third lens frame 28 is moved to the retreat position S from a position between the position P and the telephoto position T, an end 29d of the fourth lens frame 29 hits the base 21b of the fixed frame 21 and the fourth lens frame 29 stops moving in the optical axis direction. Further movement of the third frame 28 to the imaging plane releases the engagement of the engaging portions 28a and 29a, and thereafter, the third lens frame 28 is moved alone as described above.

As configured above, the third and fourth lens frames 28, 29 can be driven by a single driver alone which is originally provided to drive the third lens frame 28. This results in realizing a lens driver unit in a simple system in which an increased number of lens groups movable in the optical axis direction can be provided without increasing the size of a lens barrel or the component costs. Also, it is made possible to improve lens performance and the freedom of lens design and simplify the structure and control system of the lens driver unit.

Especially, since the engaging portion 28a of the third lens frame 28 and the engaging portion 29a of the fourth lens frame 29 are engaged in the position P on a straight line connecting the centers of the third group main guide shaft 31 and the fourth group main guide shaft 33 as shown in FIG. 5, it is made possible to minimize the amounts of moment on the third and fourth lens frames 28, 29 and improve driving stability thereof.

Figure 25:
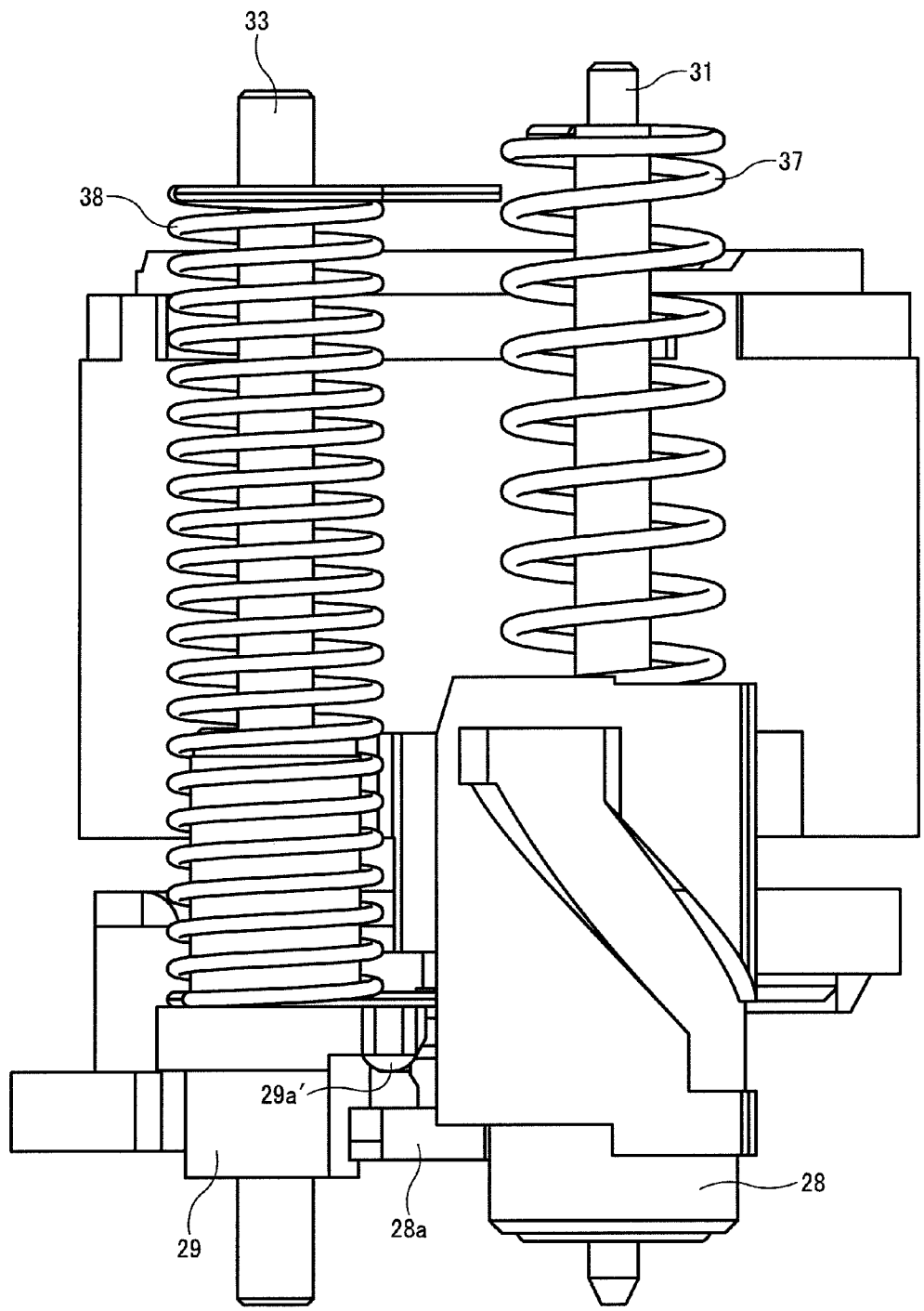
FIG. 25 shows another example of the drive system for lens groups of the lens driver unit according to one embodiment of the present invention.

Further, FIG. 25 shows another example of a driver system for the third and fourth lens frames 28, 29. As in the drawing, an engaging portion 29a' of the fourth lens frame 29 preferably has a hemispherical face, unlike the plate-like engaging portions 28a, 28b. The hemispherical engaging portion 29a can point contact with the planar engaging portion 28a. Alternatively, the engaging portion 28a of the third lens frame 28 can be hemispherical. This makes a contact area and a contact position of both of them easily distinctive and makes easier to maintain or manage component sizes.

As described through the above embodiment, according to the lens driver unit of the present invention, in the imaging state, the first and third engaging portions (28a, 29a) overlap with each other seen from the optical axis while in the contained state, the first and third engaging portions do not overlap with each other. Because of this, the second lens frame can be integrally movable with the first lens frame along with the movement of the first lens frame along the optical axis in the imaging state. And, in the contained state, without the first and third engaging portions interfering with each other, the second lens frame is movable to the contained position without interfering with the first lens frame. Accordingly, the first and second lens frames (third and fourth lens frames 28, 29) are movable in the optical axis direction with such a simple mechanism of the first and third engaging portions.

Moreover, according to the lens driver unit of the present invention the first and second lens frames are given a bias force to a direction opposite to a subject side and the drive unit is configured to drive the first and second lens frames to the subject side against the bias force. This makes it possible to operate the lens frames accurately and stably.

Further, according to the lens driver unit of the present invention the second engaging portion of the first lens frame is configured to include a face to engage with the engaging element when the first lens frame is driven along the optical axis as well as to include a cam face to engage with the engaging element when the first lens frame is rotated. This can simplify the structure of the drive and operation mechanism.

Further, according to the lens driver unit of the present invention the first and second lens groups are configured to function as a focusing lens. Accordingly, it is made possible to easily control the focal position in a wider area.

Further, according to the lens driver unit of the present embodiment the plurality of lens groups are configured to include a magnification variable function. Therefore, it is possible to improve the lens performance of a magnification variable optical system such as a zoom lens and the freedom lens design thereof.

In the above, the lens driver unit has been described using a zoom lens by way of an example. However, the present invention is not limited to such an example. The present invention is applicable to other lens driver units than a zoom lens. The present invention is also applicable to a digital camera and a hand-held data terminal device incorporating the lens driver unit as an optical system.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens driver unit which moves a plurality of lens groups between an imaging position and a contained position, the imaging position in which at least a part of the lens groups are moved to a subject side to be ready for imaging, the contained position in which the plurality of lens groups are contained in a lens barrel by retreating at least a part of the plurality of lens groups, comprising:

the plurality of lens groups including a first lens group and a second lens group each comprised of one or more lenses;

a first lens frame holding the first lens group and comprising a first engaging portion and a second engaging portion;

a second lens frame holding the second lens group and comprising a third engaging portion to engage with the first engaging portion of the first lens frame;

the lens barrel movably holding at least one of the plurality of lens groups other than the first and second lens groups along an optical axis;

a first guide element rotatably holding the first lens frame in a predetermined direction to move closer or away to/from the optical axis and guiding the first lens frame to move along the optical axis;

a second guide element guiding the second lens frame to move along the optical axis;

at least one third guide element guiding the first and second lens groups to move along the optical axis when engaging with the first and second lens frames;

an engaging element engaging with the second engaging portion of the first lens frame; and a drive unit driving the engaging element to rotate the first lens frame in the predetermined direction and move the first lens frame along the optical axis, wherein in the imaging position in which all of the plurality of lens groups including the first and second lens groups are placed on the optical axis, the first lens frame is integrally moved with the second lens frame along the optical axis by engagement of the first and third engaging portions while in the contained position, the first lens frame is rotated in the predetermined direction to retreat the first lens group outside an inner diameter of the lens barrel.

2. A lens driver unit according to claim 1, wherein:

the first and third engaging portions overlap with each other, seen from the optical axis in the imaging state; and the first and third engaging portions do not overlap with each other in the contained state.

3. A lens driver unit according to claim 1, wherein one of the first and third engaging portions includes a hemispherical contact face while the other of the first and third engaging portions includes a planar contact face.

4. A lens driver unit according to claim 1, wherein the first and third engaging portions are engaged with each other substantially on a straight line connecting a center of the first guide element and a center of the second guide element, seen from the optical axis.

5. A lens driver unit according to claim 1, wherein the drive unit comprises a single motor as a drive source.

6. A lens driver unit according to claim 1, wherein:

the first and second lens frames are given a bias force to a direction opposite to a subject side; and the drive unit is configured to drive the first and second lens frames to the subject side against the bias force.

7. A lens driver unit according to claim 1, wherein the second engaging portion of the first lens frame includes a face to engage with the engaging element when the first lens frame is driven along the optical axis as well as includes a cam face to engage with the engaging element when the first lens frame is rotated.

8. A lens driver unit according to claim 1, wherein:

the plurality of lens groups constitute an optical imaging system; and the first and second lens groups function as a focusing lens which is integrally moved in an optical axis direction to adjust a focus position of the optical imaging system.

9. A lens driver unit according to claim 1, wherein the plurality of lens groups include a function to vary a focal length of the optical imaging system.

10. An imaging device which comprises the lens driver unit according to claim 1 as an optical imaging system.

11. A hand-held data terminal device which comprises the lens driver unit according to claim 1 as an optical imaging system.

12. A lens driver unit comprising:

a first lens group and a second lens group;

a first lens frame holding the first lens group and comprising a first engaging portion and a second engaging portion;

a second lens frame holding the second lens group and comprising a third engaging portion to engage with the first engaging portion of the first lens frame;

a first guide element rotatably holding the first lens frame in a predetermined direction to move closer or away to/from an optical axis and guiding the first lens frame to move along the optical axis;

a second guide element guiding the second lens frame to move along the optical axis;

an engaging element engaging with the second engaging portion of the first lens frame; and a drive unit driving the engaging element to rotate the first lens frame in the predetermined direction and move the first lens frame along the optical axis, wherein in an imaging position in which the first and second lens groups are placed on the optical axis, the first lens frame is integrally moved with the second lens frame along the optical axis by engagement of the first and third engaging portions while in a non-imaging position, the first lens frame is rotated in the predetermined direction to retreat the first lens group into a position away from the optical axis.

* * * * *